United States Patent
Guo et al.

(10) Patent No.: US 11,838,848 B2
(45) Date of Patent: Dec. 5, 2023

(54) MULTI-LINK DEVICE PROBING METHOD AND COMMUNICATION APPARATUS

(71) Applicant: HUAWEI TECHNOLOGIES CO., LTD., Guangdong (CN)

(72) Inventors: Yuchen Guo, Shenzhen (CN); Ming Gan, Shenzhen (CN); Yunbo Li, Shenzhen (CN); Yiqing Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/987,213

(22) Filed: Nov. 15, 2022

(65) Prior Publication Data
US 2023/0072177 A1   Mar. 9, 2023

Related U.S. Application Data

(63) Continuation of application No. PCT/CN2021/104114, filed on Jul. 1, 2021.

(30) Foreign Application Priority Data

Jul. 2, 2020   (CN) ............. 202010629027.2

(51) Int. Cl.
*H04W 40/24* (2009.01)
*H04W 76/15* (2018.01)

(52) U.S. Cl.
CPC ......... *H04W 40/246* (2013.01); *H04W 76/15* (2018.02)

(58) Field of Classification Search
None
See application file for complete search history.

(56) References Cited

U.S. PATENT DOCUMENTS 9,730,252 B2   8/2017   Wang et al.
11,596,021 B2 *   2/2023   Cariou .................. H04W 76/28
(Continued)

FOREIGN PATENT DOCUMENTS

CN    102905253 A    1/2013
CN    103108391 A    5/2013
(Continued)

OTHER PUBLICATIONS

R2-130051, Samsung et al, WLAN load information for mobility support, 3GPP TSG-RAN2 Meeting #81St. Julian s, Malta, Jan. 28 to Feb. 1, 2013, total 3 pages.
(Continued)

*Primary Examiner* — Brian S Roberts
(74) *Attorney, Agent, or Firm* — HUAWEI TECHNOLOGIES CO., LTD.

(57) ABSTRACT

This application discloses a multi-link device probing method and a communication apparatus, which may be applied to a wireless local area network supporting the 802.11 be standard. The method includes: A STA multi-link device generates a probe request frame, where the probe request frame carries first indication information used to indicate a first AP working on a first link in an AP multi-link device to feed back communication information of an AP that works on a second link and that is in the AP multi-link device, the communication information is used by the STA multi-link device to perform multi-link communication with the AP multi-link device, the second link is different from a first link; and the STA multi-link device sends the probe request frame on the first link.

16 Claims, 29 Drawing Sheets

(56) References Cited

U.S. PATENT DOCUMENTS

| | | |
|---|---|---|
| 2012/0250576 A1 | 10/2012 | Rajamani et al. |
| 2013/0033995 A1 | 2/2013 | Kraglund et al. |
| 2013/0201915 A1 | 8/2013 | Wang |
| 2016/0105850 A1 | 4/2016 | Wentink |
| 2017/0118696 A1 | 4/2017 | Seok et al. |
| 2018/0206284 A1 | 7/2018 | Zhou et al. |
| 2019/0335454 A1* | 10/2019 | Huang .................. H04W 48/08 |
| 2020/0053773 A1 | 2/2020 | Seok et al. |
| 2021/0014911 A1* | 1/2021 | Patil .................. H04W 72/0446 |
| 2021/0282229 A1* | 9/2021 | Stacey .................. H04W 48/16 |
| 2021/0314846 A1* | 10/2021 | Chu .................... H04W 40/244 |
| 2021/0337613 A1* | 10/2021 | Seok ..................... H04W 48/16 |
| 2021/0367872 A1* | 11/2021 | Huang .................... H04L 43/10 |

FOREIGN PATENT DOCUMENTS

| | | |
|---|---|---|
| CN | 103228046 A | 7/2013 |
| CN | 103763742 A | 4/2014 |
| CN | 105979608 A | 9/2016 |
| CN | 108810879 A | 11/2018 |
| CN | 110521251 A | 11/2019 |
| CN | 110547026 A | 12/2019 |
| CN | 111066271 A | 4/2020 |
| RU | 2590888 C2 | 7/2016 |
| RU | 2633112 C2 | 10/2017 |
| WO | 2018136520 A1 | 7/2018 |
| WO | 2020040589 A1 | 2/2020 |

OTHER PUBLICATIONS

Abhishek Patil (QUALCOMM):"MLO: Container Structure for CapabilityAdvertisement",IEEE Draft; 11-20-0357-00-OOBE-M Lo-Contai N E R-Structu Re-For-Capability-Advertisement, IEEE-SA Mentor,Piscataway, NJ USAvol. 802.11 EHT; 802.11 be Apr. 9, 2020 (Apr. 9, 2020), pp. 1-27,XP068167434, Retrieved from the Internet:U RL:https://mentor.ieee.org/802.11 /dcn/20/11-20-0357-00-OObe-mlo-container-structure- for-capability-advertisement.pptx[retrieved on Apr. 9, 2020].

Insun Jang (LG ELECTRONICS):"Discussion on Multi-link Setup"IEEE Draft; 11-19-1509-05-OOBE-Discussion-On-Multi-Linksetup, IEEE-SA Mentor, Piscataway, NJ USAvol. 802.11 EHT; 802.11 be, No. 1-13, XP068164746,Retrieved from the Internet:5 Nov. 14, 2019 (Nov. 14, 2019), pagesU RL:https://mentor.iee.org/802.11 /dcn/19/11-19-1509-05-OObe-discussion-on-multi-link-setup.pptx[retrieved on Nov. 14, 2019].

Abhishek Patil (QUALCOMM):"MLO: Container Structure for CapabilityAdvertisement",IEEE Draft; 11-20-0357-02-OOBE-M Lo-Contai N E R-Structu Re-For-Capability-Advertisement, IEEE-SA Mentor,Piscataway, NJ USAvol. 802.11 EHT; 802.11 be, noXP068169647,Retrieved from the Internet:2 Jun. 22, 2020 (Jun. 22, 2020), pp. 1-30,U RL:https://mentor.ieee.org/802.11 /dcn/20/11-20-0357-02-OObe-mlo-container-structure-for-capability-advertisement.pptx[retrieved on Jun. 22, 2020].

* cited by examiner

MULTI-LINK DEVICE PROBING METHOD AND COMMUNICATION APPARATUS

CROSS-REFERENCE TO RELATED APPLICATIONS

This application is a continuation of International Application No. PCT/CN2021/104114, filed on Jul. 1, 2021, which claims priority to Chinese Patent Application No. 202010629027.2, filed on Jul. 2, 2020. The disclosures of the aforementioned applications are hereby incorporated by reference in their entireties.

TECHNICAL FIELD

This application relates to the field of communication technologies, and in particular, to a multi-link device probing method and a communication apparatus.

BACKGROUND

With the development of wireless technologies, more and more wireless devices support multi-link communication. For example, the wireless devices support communication in frequency bands of 2.4 GHz, 5 GHz, and 60 GHz at the same time, or communication on different channels of a same frequency band (or different frequency bands), thereby improving a communication rate between the devices. Such a device is generally referred to as a multi-band device or a multi-link device (multi-link device, MLD), or sometimes referred to as a multi-link entity or a multi-band entity. The following uses the multi-link device as an example for description.

The multi-link device may be an access point multi-link device, or may be a station multi-link device. The access point multi-link device includes one or more access points (access points, APs). The station multi-link device includes one or more non-access point stations (non-access point stations, non-AP STAs). The non-access point station may be referred to as a station for short. For example, as shown in FIG. 1, an AP multi-link device includes AP 1 to AP n, and a STA multi-link device includes STA 1 to STA n. The n STAs in the STA multi-link device may communicate with the n APs in the AP multi-link device after association relationships are established between the n STAs and the n APs. For example, STA 1 associates with AP 1, STA 2 associates with AP 2, . . . , and STA n associates with AP n.

A STA in the STA multi-link device may initiate an active scanning process to discover an AP in the AP multi-link device and perform subsequent association. For example, STA 1 in the STA multi-link device sends a probe request frame (probe request frame) through link 1. After receiving the probe request frame through link 1, AP 1 may return a probe response frame (probe response frame). The probe response frame carries communication information of AP 1. The communication information is used by the STA multi-link device to perform multi-link communication with the AP multi-link device subsequently. Generally, to probe APs on a plurality of links, the STA multi-link device needs to send the probe request frame on the plurality of links, to obtain communication information of the APs on the plurality of links. However, when a link cannot be used to send the probe request frame (for example, a fault occurs on the link or the link is congested), the STA multi-link device cannot obtain, in time, communication information of an AP working on the link.

SUMMARY

This application provides a multi-link device probing method and a communication apparatus, to help obtain communication information of an AP in time.

According to a first aspect, this application provides a multi-link device probing method. The method includes: A station STA multi-link device generates a probe request frame, where the probe request frame carries first indication information, the first indication information is used to indicate an access point (AP) multi-link device to feed back communication information of an AP that works on at least one link and that is in the AP multi-link device, the communication information is used by the STA multi-link device to perform multi-link communication with the AP multi-link device, the at least one link includes a second link, and the second link is different from a first link; and the STA multi-link device sends the probe request frame on the first link.

Optionally, the at least one link may further include the first link.

In the method according to the first aspect, the probe request frame sent by the STA multi-link device on one link may request communication information that is of an AP in the AP multi-link device and that is fed back on another link. It can be learned that, based on the method described in the first aspect, when the STA multi-link device cannot send the probe request frame through the second link, the STA multi-link device can obtain, in time, the communication information of the AP working on the second link. In addition, the STA multi-link device sends the probe request frame only on the first link, and only needs to focus on a status of the first link. This is easy to manage. In addition, because only a response frame on the first link needs to be monitored, power consumption of the STA multi-link device can be reduced. In addition, if the STA multi-link device needs to be associated with the AP multi-link device on a plurality of links, the STA multi-link device does not need to send the probe request frame on each of the plurality of links, so that transmission overheads are reduced.

In a possible implementation, the STA multi-link device receives, on the first link, a probe response frame sent by the AP multi-link device, where the probe response frame carries the communication information of the AP that works on the at least one link and that is in the AP multi-link device. Based on this possible implementation, the STA multi-link device can successfully receive the communication information of the AP that works on the at least one link and that is in the AP multi-link device.

According to a second aspect, this application provides a multi-link device probing method. The method includes: An access point AP multi-link device receives, on a first link, a probe request frame sent by a station STA multi-link device, where the probe request frame carries first indication information, the first indication information is used to indicate the AP multi-link device to feed back communication information of an AP that works on at least one link and that is in the AP multi-link device, the communication information is used by the STA multi-link device to perform multi-link communication with the AP multi-link device, the at least one link includes a second link, and the second link is different from the first link; and the AP multi-link device sends a probe response frame to the STA multi-link device on the first link, where the probe response frame carries the communication information of the AP that works on the at least one link and that is in the AP multi-link device. For beneficial effects of the second aspect, refer to beneficial effects of the first aspect. Details are not described herein again.

In a possible implementation of the first aspect or the second aspect, the first indication information includes a first field.

The first field carries an address of the AP multi-link device. To be specific, the first field indicates, by using the address of the AP multi-link device, an AP multi-link device that needs to feed back the communication information of the AP working on the at least one link. In this way, the AP multi-link device that needs to feed back the communication information can be accurately indicated.

Alternatively, the first field carries an identifier of the AP multi-link device. To be specific, the first field indicates, by using the identifier of the AP multi-link device, an AP multi-link device that needs to feed back the communication information of the AP working on the at least one link. In this way, the AP multi-link device that needs to feed back the communication information can be accurately indicated.

Alternatively, the first field carries a service set identifier SSID of the AP multi-link device. To be specific, the first field indicates, by using the SSID of the AP multi-link device, an AP multi-link device that needs to feed back the communication information of the AP working on the at least one link. In this way, the AP multi-link device that needs to feed back the communication information can be accurately indicated.

Alternatively, the first field carries an SSID of the AP multi-link device on the first link. To be specific, the first field indicates, by using the SSID of the AP multi-link device on the first link, an AP multi-link device that needs to feed back the communication information of the AP working on the at least one link. In this way, the AP multi-link device that needs to feed back the communication information can be accurately indicated.

Alternatively, a value of the first field is a preset value, and the first indication information is specifically used to indicate the AP multi-link device that receives the probe request frame to feed back the communication information of the AP working on the at least one link. In this manner, addresses/identifiers/SSIDs of a plurality of AP multi-link devices do not need to be carried, and only the value of the first field needs to be set to a special value, for example, a value with only 1 or only 0, so that all AP multi-link devices that receive the probe request frame are enabled to feed back the communication information of the AP working on the at least one link. Therefore, based on this possible implementation, signaling overheads can be reduced.

In a possible implementation of the first aspect or the second aspect, the first indication information further includes a second field, and the second field is used to indicate the at least one link. In other words, the second field is used to indicate that the AP multi-link device needs to feed back communication information of an AP on a specific link. The second field is used to indicate the at least one link, so that the communication information of the AP can be flexibly obtained according to a requirement of the STA multi-link device.

Optionally, the second field carries a feedback type, and when the feedback type is a first value, the feedback type is used to indicate the AP multi-link device to feed back communication information of APs that work on all links and that are in the AP multi-link device. Optionally, when the feedback type is a second value, the feedback type is used to indicate the AP multi-link device to feed back communication information of an AP that works on the first link and that is in the AP multi-link device. Optionally, the second field is in a multi-link element (ML element). Further, the second field may be in a multi-link device common (MLD common) field of the multi-link element. The feedback type can be indicated by using a few bits, and therefore, indicating a link by using the feedback type helps reduce signaling overheads.

Optionally, the second field carries an identifier of the at least one link. Optionally, the second field is in a multi-link element (ML element). Further, the second field may be in a multi-link device common (MLD common) field of the multi-link element, and the second field includes at least one optional subelement. Based on this optional manner, a link can be accurately indicated by using an identifier of the link.

Optionally, the second field carries a bitmap, the bitmap includes bits corresponding to links, a first bit is any bit in the bitmap, and when a value of the first bit is a first value, the first bit indicates the AP multi-link device to feed back communication information of an AP that works on a link corresponding to the first bit and that is in the AP multi-link device, or when the value of the first bit is a second value, the first bit indicates the AP multi-link device not to feed back the communication information of the AP that works on the link corresponding to the first bit and that is in the AP multi-link device. Optionally, when the second field carries a bitmap, the second field may be in a multi-link element. Indicating a link based on this optional manner helps reduce signaling overheads.

In another possible implementation, the second field may not indicate a link for which communication information needs to be fed back. The second field indicates a known link, where communication information of an AP working on the known link is already known to the STA multi-link device. For example, if the STA multi-link device already knows communication information of AP 1 that works on link 1 and that is in AP multi-link device 1, the STA multi-link device only needs to indicate link 1 by using the second field. After receiving the probe request frame, AP multi-link device 1 parses the second field to determine that the STA multi-link device already knows the communication information of AP 1. In this case, AP multi-link device 1 needs to feed back communication information of only AP 2 and AP 3. It can be learned that indicating the known link by using the second field helps reduce signaling overheads.

Optionally, the second field may indicate the known link by carrying an identifier of the known link, or may indicate the known link by carrying a bitmap. The bitmap includes bits corresponding to links, a first bit is any bit in the bitmap, and when a value of the first bit is a first value, the first bit indicates that a link corresponding to the first bit is the known link, or when the value of the first bit is a second value, the first bit indicates that the link corresponding to the first bit is an unknown link.

In a possible implementation of the first aspect or the second aspect, the first field is in the multi-link element (multi-link element) of the probe request frame. The first field is carried by using an existing multi-link element in the standard, and a new information element does not need to be additionally defined. The change to the standard is small, and is easier to implement.

Optionally, the first field is a multi-link device address (MLD address) field in the multi-link element, and the multi-link device address field carries the address of the AP multi-link device, or a value of the multi-link device address field is the preset value. The address of the AP multi-link device or the preset value is carried by using an existing field in the standard, and a new field does not need to be additionally defined. The change to the standard is small, and is easier to implement.

Optionally, the multi-link element further carries second indication information, and the second indication information indicates that the multi-link device address field is used to indicate an AP multi-link device that needs to feed back the communication information. Based on this optional manner, the AP multi-link device can accurately identify content carried in the multi-link device address field.

Optionally, when the first field is the multi-link device address field in the multi-link element, the multi-link element does not carry an optional subelement, to indicate that the multi-link device address field is used to indicate an AP multi-link device that needs to feed back the communication information of the AP working on the at least one link. Based on this optional manner, the AP multi-link device can accurately identify content carried in the multi-link device address field.

According to a third aspect, a communication apparatus is provided. The apparatus may be a STA multi-link device, or may be an apparatus in the STA multi-link device, or an apparatus that can be used in cooperation with the STA multi-link device. The communication apparatus may alternatively be a chip system. The communication apparatus may perform the method according to the first aspect. A function of the communication apparatus may be implemented by hardware, or may be implemented by hardware by executing corresponding software. The hardware or software includes one or more units corresponding to the foregoing function. The unit may be software and/or hardware. For operations performed by the communication apparatus and beneficial effects thereof, refer to the method in the first aspect and the beneficial effects thereof. Repeated Parts are not Described Again.

According to a fourth aspect, a communication apparatus is provided. The apparatus may be an AP multi-link device, or may be an apparatus in the AP multi-link device, or an apparatus that can be used in cooperation with the AP multi-link device. The communication apparatus may alternatively be a chip system. The communication apparatus may perform the method according to the second aspect. A function of the communication apparatus may be implemented by hardware, or may be implemented by hardware by executing corresponding software. The hardware or software includes one or more units corresponding to the foregoing function. The unit may be software and/or hardware. For operations performed by the communication apparatus and beneficial effects thereof, refer to the method in the second aspect and the beneficial effects thereof. Repeated parts are not described again.

According to a fifth aspect, this application provides a communication apparatus. The communication apparatus may be a STA multi-link device or a chip system. The communication apparatus includes at least one processor, and when the processor invokes a computer program in a memory, the method performed by the STA multi-link device according to the first aspect is performed.

According to a sixth aspect, this application provides a communication apparatus. The communication apparatus may be an AP multi-link device or a chip system. The communication apparatus includes at least one processor, and when the processor invokes a computer program in a memory, the method performed by the AP multi-link device according to the second aspect is performed.

According to a seventh aspect, this application provides a communication apparatus. The communication apparatus may be a STA multi-link device or a chip system. The communication apparatus includes a processor and a memory. The memory is configured to store a computer program. The processor is configured to execute the computer program stored in the memory, to enable the communication apparatus to perform the method performed by the STA multi-link device according to the first aspect.

According to an eighth aspect, this application provides a communication apparatus. The communication apparatus may be an AP multi-link device or a chip system. The communication apparatus includes a processor and a memory. The memory is configured to store a computer program. The processor is configured to execute the computer program stored in the memory, to enable the communication apparatus to perform the method performed by the AP multi-link device according to the second aspect.

According to a ninth aspect, this application provides a communication apparatus. The communication apparatus may be a STA multi-link device. The communication apparatus includes a processor, a memory, and a transceiver. The transceiver is configured to receive a signal or send a signal. The memory is configured to store a computer program. The processor is configured to invoke the computer program from the memory, to perform the method performed by the STA multi-link device according to the first aspect.

According to a tenth aspect, this application provides a communication apparatus. The communication apparatus may be an AP multi-link device. The communication apparatus includes a processor, a memory, and a transceiver. The transceiver is configured to receive a signal or send a signal. The memory is configured to store a computer program. The processor is configured to invoke the computer program from the memory, to perform the method performed by the AP multi-link device to the second aspect.

According to an eleventh aspect, this application provides a communication apparatus. The communication apparatus may be a STA multi-link device or a chip system. The communication apparatus includes at least one processor and a communication interface. The processor runs a computer program to perform the method performed by the STA multi-link device according to the first aspect.

According to a twelfth aspect, this application provides a communication apparatus. The communication apparatus may be an AP multi-link device or a chip system. The communication apparatus includes at least one processor and a communication interface. The processor runs a computer program to perform the method performed by the AP multi-link device according to the second aspect.

According to a thirteenth aspect, this application provides a computer-readable storage medium. The computer-readable storage medium is configured to store instructions. When the instructions are executed, the method performed by the STA multi-link device according to the first aspect is implemented.

According to a fourteenth aspect, this application provides a computer-readable storage medium. The computer-readable storage medium is configured to store instructions. When the instructions are executed, the method performed by the AP multi-link device according to the second aspect is implemented.

According to a fifteenth aspect, this application provides a computer program product including instructions. When the instructions are executed, the method performed by the STA multi-link device according to the first aspect is implemented.

According to a sixteenth aspect, this application provides a computer program product including instructions. When the instructions are executed, the method performed by the AP multi-link device according to the second aspect is implemented.

DESCRIPTION OF EMBODIMENTS

Figure 1:
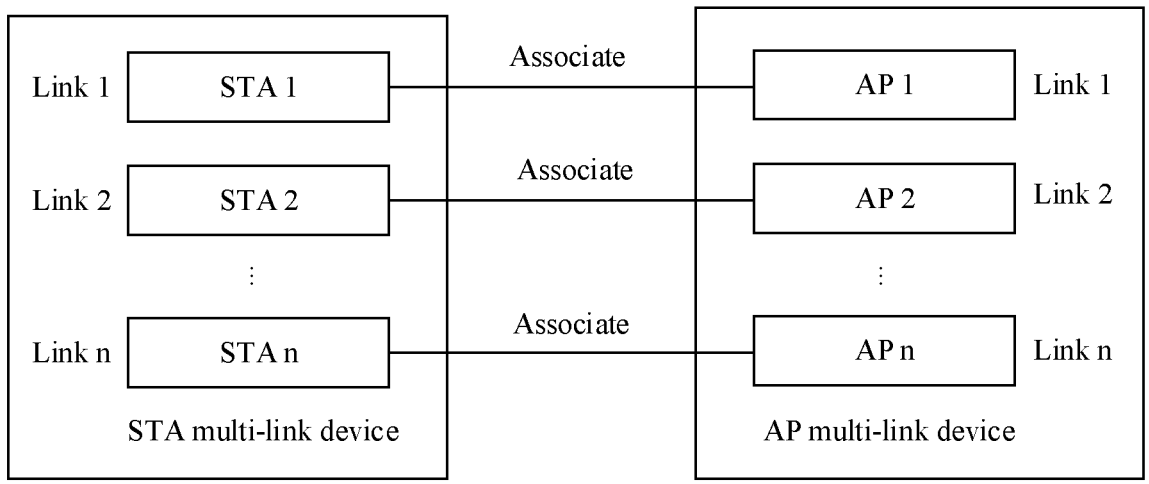
FIG. 1 is a schematic diagram of an existing multi-link device.

In the specification, claims, and accompanying drawings of this application, the terms "first", "second", and so on are intended to distinguish between different objects but do not indicate a particular order. In addition, the terms "including", "having", and any other variant thereof are intended to cover non-exclusive inclusion. For example, a process, method, system, product, or device that includes a series of steps or units is not limited to the listed steps or units, but optionally further includes an unlisted step or unit, or optionally further includes another inherent step or unit of the process, method, product, or device.

Mentioning an "embodiment" in this specification means that a particular characteristic, structure, or feature described with reference to the embodiment may be included in at least one embodiment of this application. The phrase shown in various locations in this specification may not necessarily refer to a same embodiment, and is not an independent or optional embodiment exclusive from another embodiment. It is explicitly and implicitly understood by persons skilled in the art that the embodiments described in this specification may be combined with another embodiment.

In this application, "at least one (item)" means one or more, "a plurality of" means two or more, and "at least two (items)" means two or more than three (including three). The term "and/or" is used to describe an association relationship for describing associated objects and represents that three relationships may exist. For example, "A and/or B" may represent the following three cases: Only A exists, only B exists, and both A and B exist, where A and B may be singular or plural. The character "/" generally represents an "or" relationship between the associated objects. "At least one of the following items (pieces)" or a similar expression thereof indicates any combination of these items, including a single item (piece) or any combination of a plurality of items (pieces). For example, at least one (piece) of a, b, or c may represent: a, b, c, "a and b", "a and c", "b and c", or "a, b, and c", where a, b, and c may be singular or plural.

Embodiments of this application provide a multi-link device probing method and a communication apparatus. The method provided in the embodiments of this application is applied to a wireless communication system. The wireless communication system may be a wireless local area network (wireless local area network, WLAN) or a cellular network. The method may be implemented by a communication device in the wireless communication system or a chip or a processor in the communication device. The communication device may be a wireless communication device that supports concurrent transmission performed on a plurality of links. For example, the communication device is referred to as a multi-link device (Multi-link device) or a multi-band device (multi-band device). In the wireless local area network, the communication device supports communication performed by using an IEEE 802.11 series protocol, and the IEEE 802.11 series protocol includes: 802.11be, 802.11ax, or 802.11a/b/g/n/ac.

To better understand the embodiments of this application, the following first describes a system architecture in the embodiments of this application.

The system architecture provided in the embodiments of this application includes a plurality of multi-link devices. The multi-link device (MLD) includes one or more subordinate stations, and the subordinate stations are logical stations. "The multi-link device includes subordinate stations" is also briefly described as "the multi-link device includes stations" in the embodiments of this application. The subordinate station may be an access point (Access Point, AP) or a non-access point station (non-Access Point Station, non-AP STA). For ease of description, in this application, a multi-link device whose subordinate station is an AP may be referred to as a multi-link AP, a multi-link AP device, or an AP multi-link device (AP multi-link device). A multi-link device whose subordinate station is a non-AP STA may be referred to as a multi-link STA, a multi-link STA device, or a STA multi-link device (STA multi-link device).

The multi-link device (MLD) may comply with the 802.11 series protocols, to implement wireless communication. For example, the multi-link device complies with extremely high throughput (Extremely High Throughput, EHT) or complies with 802.11be, or compatibly supports 802.11be, to implement communication with other devices. Certainly, the other devices may be multi-link devices, or may not be multi-link devices.

In a multi-link device, each station may separately work on one link, but a plurality of stations are allowed to work on the same link.

Figure 2:
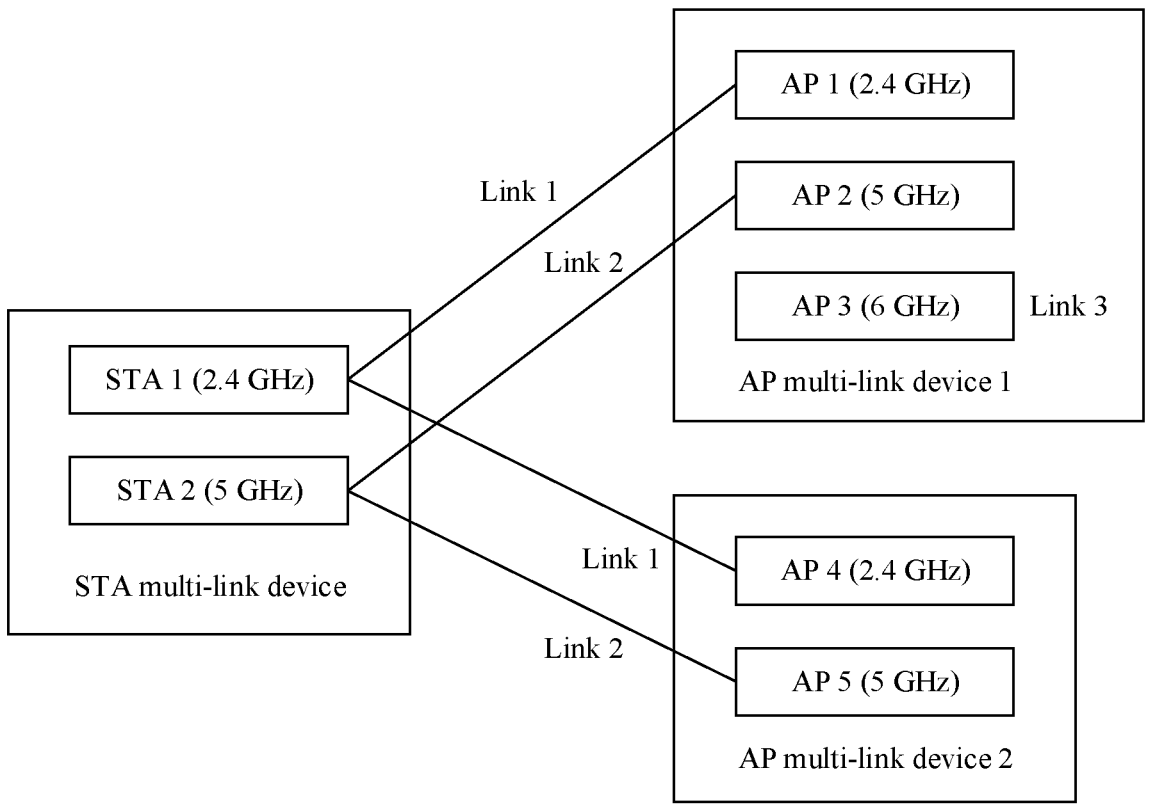
FIG. 2 is a schematic diagram of a system architecture according to an embodiment of this application.

FIG. 2 is a diagram of a system architecture according to an embodiment of this application. In FIG. 2, for example, the system architecture includes two AP multi-link devices (AP multi-link devices) and one STA multi-link device (STA multi-link device). The system architecture may include more or fewer AP multi-link devices, or include more STA multi-link devices.

If a multi-link device includes one or more access points (access points, APs), the multi-link device may be referred to as an AP multi-link device. The AP multi-link device may also be referred to as a multi-link AP or a multi-link AP device. For example, as shown in FIG. 2, AP multi-link device 1 includes AP 1, AP 2, and AP 3, and AP multi-link device 2 includes AP 4 and AP 5.

If a multi-link device includes one or more non-access point stations (non-access point stations, non-AP STAs), the multi-link device may be referred to as a STA multi-link device. For ease of description, a non-access point station is referred to as a station for short in the following. The STA multi-link device may also be referred to as a multi-link STA or a multi-link STA device. For example, as shown in FIG. 2, the STA multi-link device includes STA 1 and STA 2.

Frequency bands in which the multi-link device in the embodiments of this application works may include but are not limited to one or a combination of the following: sub 1 GHz, 2.4 GHz, 5 GHz, 6 GHz, and a high frequency 60 GHz. For example, as shown in FIG. 2, in the STA multi-link device, STA 1 works at 2.4 GHz, and STA 2 works at 5 GHz. AP 1 included in AP multi-link device 1 works at 2.4 GHz, AP 2 works at 5 GHz, and AP 3 works at 6 GHz. AP 4 in AP multi-link device 2 works at 2.4 GHz, and AP 5 works at 5 GHz. Each frequency band corresponds to a link. It should be noted that the frequency bands supported by the AP multi-link device and the STA multi-link device shown in FIG. 2 are merely examples. In actual application, the AP multi-link device and the STA multi-link device may further support more or fewer frequency bands, that is, the AP multi-link device and the STA multi-link device may work on more links or fewer links. This is not limited in the embodiments of this application.

Figure 3A:
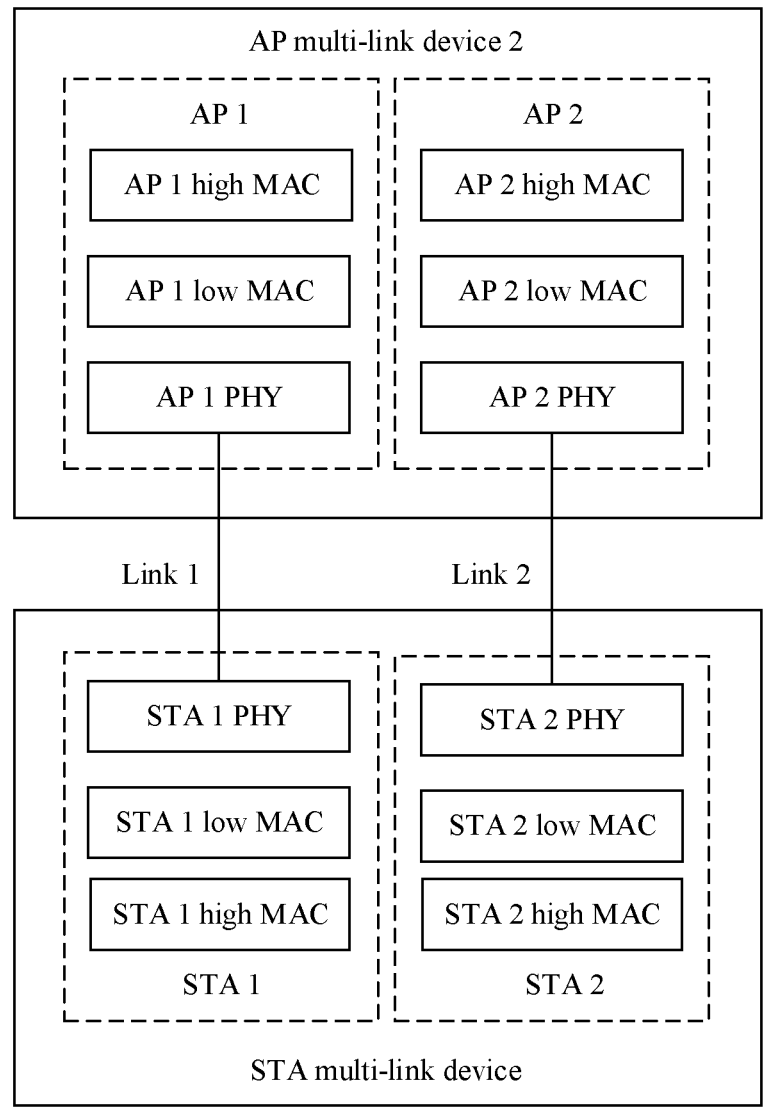
FIG. 3a is a schematic diagram of a structure of a multi-link device according to an embodiment of this application.
Figure 3B:
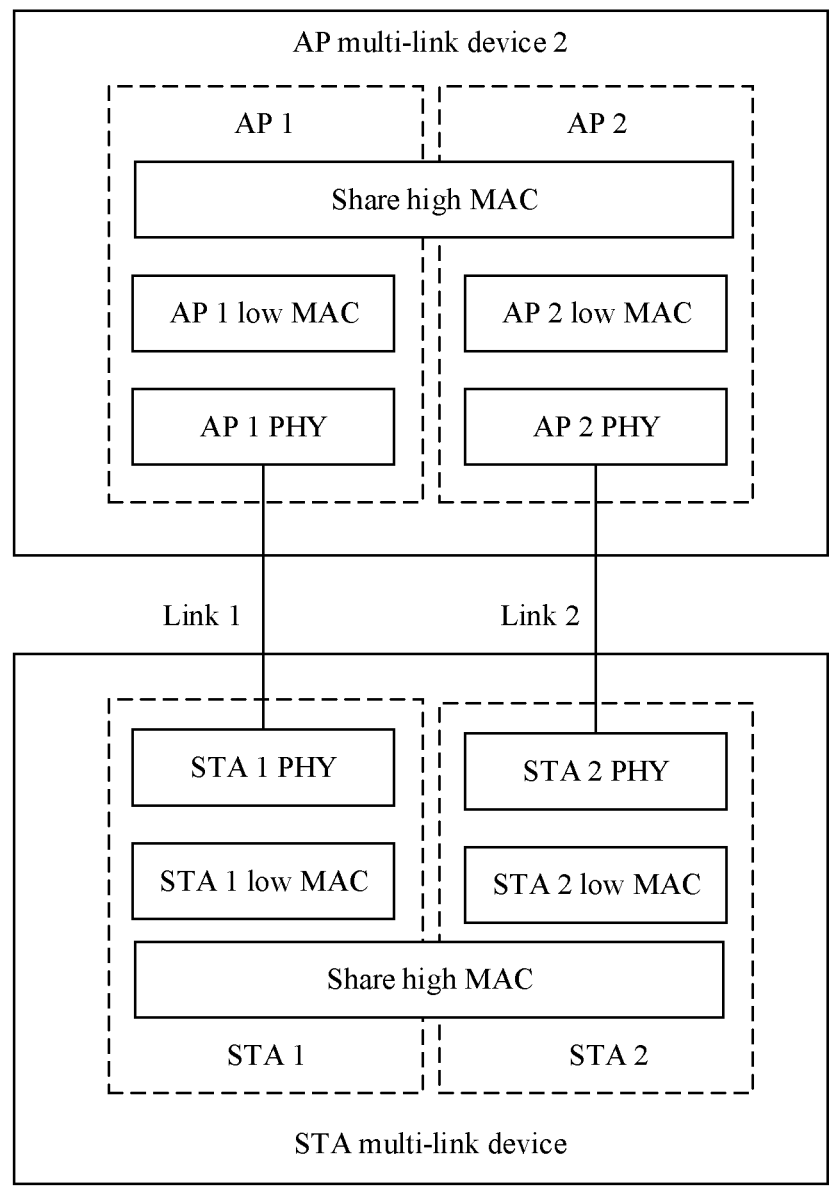
FIG. 3b is a schematic diagram of a structure of a multi-link device according to an embodiment of this application.

FIG. 3a and FIG. 3b are schematic diagrams of structures of AP multi-link device 2 and the STA multi-link device. A structure of AP multi-link device 1 and the structure of AP multi-link device 2 have the same principle, and details are not described herein again. The 802.11 standard focuses on an 802.11 physical layer (Physical layer, PHY) part and a media access control (Media Access Control, MAC) layer part in the AP multi-link device and the STA multi-link device (such as a mobile phone or a notebook computer).

As shown in FIG. 3a, a plurality of APs included in AP multi-link device 2 are independent of each other at a low MAC (Low MAC) layer and a PHY layer, and are also independent of each other at a high MAC (High MAC) layer. A plurality of STAs included in the STA multi-link device are independent of each other at a low MAC (Low MAC) layer and a PHY layer, and are also independent of each other at a high MAC (High MAC) layer.

As shown in FIG. 3b, a plurality of APs included in AP multi-link device 2 are independent of each other at a low MAC (Low MAC) layer and a PHY layer, and share a high MAC (High MAC) layer. A plurality of STAs included in the STA multi-link device are independent of each other at a low MAC (Low MAC) layer and a PHY layer, and share a high MAC (High MAC) layer.

Certainly, the STA multi-link device may use a structure in which STAs are independent of each other at a high MAC layer, and AP multi-link device 2 uses a structure in which APs share a high MAC layer. Alternatively, the STA multi-link device may use a structure in which STAs share a high MAC layer, and AP multi-link device 2 uses a structure in which APs are independent of each other at a high MAC layer. For example, the high MAC layer or the low MAC layer may be implemented by one processor in a chip system of the multi-link device, or may be separately implemented by different processing modules in a chip system.

Figure 3C:
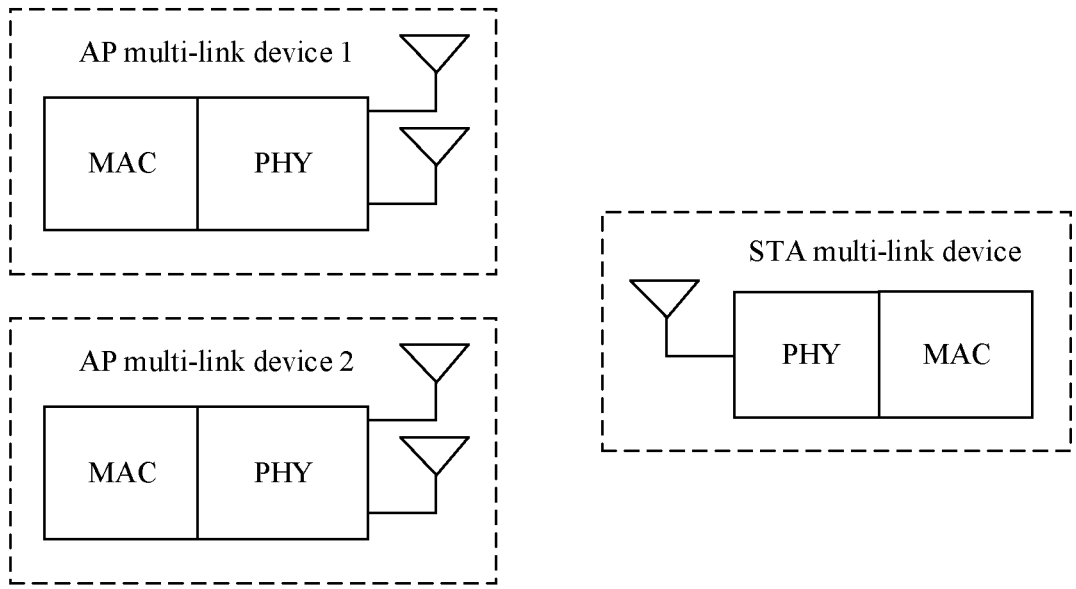
FIG. 3c is a schematic diagram of a structure of a multi-link device according to an embodiment of this application.

The multi-link device in the embodiments of this application may be a single-antenna device, or may be a multi-antenna device, for example, a device with more than two antennas. The quantity of antennas included in the multi-link device is not limited in the embodiments of this application. For example, in FIG. 3c, the AP multi-link device is a multi-antenna device and the STA multi-link device is a single-antenna device. In the embodiments of this application, the multi-link device may allow services of the same access type to be transmitted on different links, and even allow same data packets to be transmitted on different links. Alternatively, the multi-link device may not allow services of the same access type to be transmitted on different links, but may allow services of different access types to be transmitted on different links.

The multi-link device in the embodiments of this application is an apparatus with a wireless communication function. The apparatus may be a complete device, or may be a chip, a processing system, or the like installed in the complete device. The device installed with the chip or the processing system can implement the method and the function in the embodiments of this application under control of the chip or the processing system.

For example, the multi-link STA in the embodiments of this application has a wireless transceiver function, may support the 802.11 series protocols, and may communicate with a multi-link AP, another multi-link STA, or a single-link device. For example, the multi-link STA is any user communication device that allows a user to communicate with an AP and further communicate with a WLAN. For example, the multi-link STA may be user equipment that can be connected to a network, such as a tablet computer, a desktop computer, a laptop computer, a notebook computer, an ultra-mobile personal computer (Ultra-mobile Personal Computer, UMPC), a handheld computer, a netbook, a personal digital assistant (Personal Digital Assistant, PDA), or a mobile phone, may be an internet of things node in the internet of things, or may be a vehicle-mounted communication apparatus in the internet of vehicles. The multi-link STA may alternatively be a chip and a processing system in the foregoing terminals.

The multi-link AP in the embodiments of this application is an apparatus that serves the multi-link STA, and may support the 802.11 series protocols. For example, the multi-link AP may be a communication entity such as a communication server, a router, a switch, or a bridge, or the multi-link AP may include various forms of macro base stations, micro base stations, and relay stations. Certainly, the multi-link AP may alternatively be a chip and a processing system in the various forms of devices, to implement the method and the function in the embodiments of this application. In addition, the multi-link device may support high-rate and low-latency transmission. With the continuous evolution of application scenarios of the wireless local area network, the multi-link device may be further applied to more scenarios. For example, the multi-link device may be a sensor node (such as a smart water meter, a smart electricity meter, a smart air detection node) in a smart city, a smart device (such as a smart camera, a projector, a display, a TV, a stereo, a refrigerator, and a washing machine) in smart home, a node in the internet of things, an entertainment terminal (for example, a wearable device such as an AR and a VR), a smart devices (such as a printer and a projector) in smart office, an IoV device in the internet of vehicles, and some infrastructures (such as a vending machine, a self-service navigation station in a supermarket, self-service cash register device, and a self-service ordering machine) in daily life scenarios. Specific forms of the multi-link STA and the multi-link AP are not specifically limited in the embodiments of this application. Descriptions are provided herein only as an example. The 802.11 series protocols may include 802.11be, 802.11ax, 802.11a/b/g/n/ac, and the like.

The following further describes in detail the multi-link device probing method and the communication apparatus that are provided in the embodiments of this application.

Figure 4:
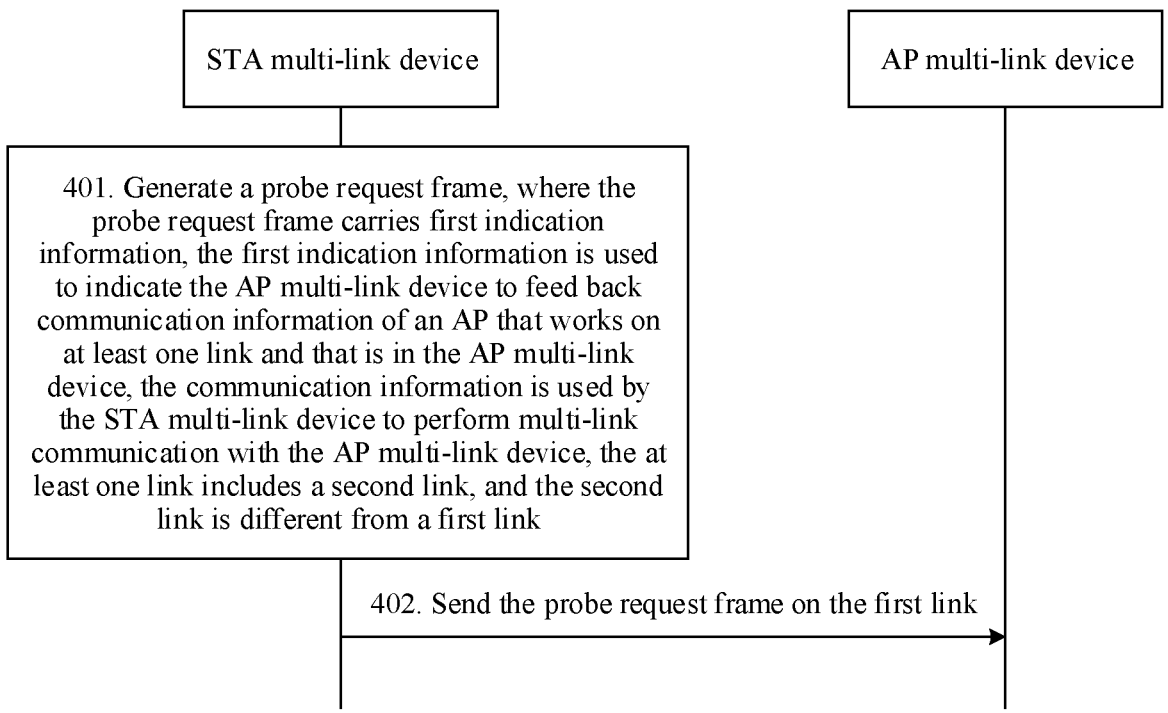
FIG. 4 is a schematic flowchart of a multi-link device probing method according to an embodiment of this application.

FIG. 4 is a schematic flowchart of a multi-link device probing method according to an embodiment of this application. As shown in FIG. 4, the multi-link device probing method includes the following step 401 and step 402. The method shown in FIG. 4 may be performed by a STA multi-link device and an AP multi-link device. Alternatively, the method shown in FIG. 4 may be performed by a chip in the STA multi-link device and a chip in the AP multi-link device. FIG. 4 is described by using an example in which the STA multi-link device and the AP multi-link device are used as execution bodies.

401. The STA multi-link device generates a probe request frame, where the probe request frame carries first indication information, the first indication information is used to indicate the AP multi-link device to feed back communication information of an AP that works on at least one link and that is in the AP multi-link device, the communication information is used by the STA multi-link device to perform multi-link communication with the AP multi-link device, the at least one link includes a second link, and the second link is different from the first link.

In this embodiment of this application, the first indication information is specifically used to indicate one or more AP multi-link devices to feed back the communication information of the AP that works on the at least one link and that is in the AP multi-link devices. Referring to FIG. 2, for example, the first indication information indicates AP multi-link device 1 to feed back communication information of an AP that works on the at least one link and that is in AP multi-link device 1, and indicates AP multi-link device 2 to feed back communication information of an AP that works on the at least one link and that is in AP multi-link device 2. Alternatively, the first indication information indicates AP multi-link device 1 to feed back communication information of an AP that works on the at least one link and that is in AP multi-link device 1. Alternatively, the first indication information indicates AP multi-link device 2 to feed back communication information of an AP that works on the at least one link and that is in AP multi-link device 2.

In this embodiment of this application, the at least one link includes the second link, the second link is different from the first link, and the first link is a link for sending the probe request frame. The at least one link includes the following three cases: a. The at least one link includes only one second link. b. The at least one link includes a plurality of second links. c. The at least one link includes a first link and one or more second links. In other words, the first indication information sent on the first link may indicate the AP multi-link device to feed back communication information of an AP on another link.

For example, as shown in FIG. 2, the STA multi-link device generates a probe request frame to be sent on link 1. The probe request frame carries first indication information, and the first indication information indicates AP multi-link device 1 to feed back the communication information of the AP that works on the at least one link and that is in AP multi-link device 1. The AP multi-link device 1 may feed back communication information of AP 2 working on link 2, or feed back communication information of AP 2 working on link 2 and communication information of AP 3 working on link 3, or feed back communication information of AP 1 working on link 1, communication information of AP 2 working on link 2, and communication information of AP 3 working on link 3.

In a possible implementation, links included in the at least one link are links on which STAs in the STA multi-link device work. For example, as shown in FIG. 2, AP multi-link device 1 feeds back the communication information of AP 1 and AP 2. The STA multi-link device works only in 2.4 GHz and 5 GHz frequency bands. The STA multi-link device does not associate with AP 3 working at 6 GHz. Therefore, AP multi-link device 1 does not need to feed back the communication information of AP 3. In this way, transmission resources can be saved.

In a possible implementation, the first link is a link on which any STA in the STA multi-link device works. For example, as shown in FIG. 2, the STA multi-link device may select link 1 or link 2 to send the probe request frame.

In another possible implementation, the first link may be a link that is predefined in a protocol and that is used to send the probe request frame.

In still another possible implementation, the first link may be a link corresponding to a minimum frequency band in which the STA multi-link device works. For example, as shown in FIG. 2, the first link may be link 1. Generally, the minimum frequency band can be supported by many multi-link devices. The probe request frame is sent on the link corresponding to the minimum frequency band in which the STA multi-link device works, so that more other AP multi-link devices can receive the probe request frame.

In this embodiment of this application, the communication information is used by the STA multi-link device to perform multi-link communication with the AP multi-link device. For example, the communication information is used by a STA in the STA multi-link device to subsequently associate with an AP in the AP multi-link device, or is used by the STA multi-link device to establish multi-link communication with the AP multi-link device. Alternatively, after a STA in the STA multi-link device associates with an AP in the AP multi-link device, the communication information may be further used for data transmission.

In a possible implementation, the communication information includes a capability information unit and an operation information unit. The capability information unit carries capability information of an AP, that is, features supported and features not supported by the AP. The capability information unit further includes parameters such as a supported MCS set, a maximum aggregate media access control protocol data unit (A-MPDU) length, and a minimum interval of start locations of media access control protocol data units (MPDUs). The operation information element carries current working parameters of the AP, for example, a working channel location, a maximum bandwidth, a basic modulation and coding scheme (modulation and coding scheme, MCS) and number of spatial streams set, and a threshold for sending an RTS.

Optionally, the capability information unit carries the following information: HT capabilities (HT capabilities), VHT capabilities (VHT capabilities), HE capabilities (HE Capabilities), and EHT capabilities (EHT capabilities). The operation information unit carries the following information: an EDCA parameter setting (EDCA Parameter Setting), an HT operation (HT operation), a VHT operation (VHT operation), an HE operation (HE Operation), and an EHT operation (EHT operation). Optionally, when the first link is in a 6 GHz frequency band, the communication information may not include the four pieces of information: the HT capabilities, the HT operation, the VHT capabilities, and the VHT operation.

Optionally, the communication information may further include one or more of the following information: timestamp and beacon interval fields (the timestamp and beacon interval fields), a DSSS parameter set (DSSS parameter set), an IBSS parameter set (IBSS parameter set), a country (country), a channel switch announcement (channel switch announcement), an extended channel switch announcement (extended channel switch announcement), wide bandwidth channel switch (wide bandwidth channel switch), a transmit power envelope (transmit power envelope), supported operating classes (supported operating classes), IBSS DFS, ERP information (ERP information), SIG beacon compatibility (SIG beacon compatibility), a short beacon interval (short beacon interval), SIG capabilities (SIG capabilities), and a SIG operation (SIG operation (11ah)).

402. The STA multi-link device sends the probe request frame on the first link.

If the AP multi-link device receives the probe request frame, the AP multi-link device sends a probe response frame to the STA multi-link device on the first link, where the probe response frame carries the communication information of the AP that works on the at least one link and that is in the AP multi-link device. Correspondingly, the STA multi-link device may receive, on the first link, the probe response frame sent by the AP multi-link device.

If an AP multi-link device that needs to feed back the communication information and that is indicated by the first indication information does not receive the probe request frame, the STA multi-link device does not receive the probe response frame.

It can be learned that, by implementing the method described in FIG. 4, the STA multi-link device can receive, by sending the probe request frame on the first link, the communication information of the AP that works on the second link and that is in the AP multi-link device. Based on the method described in FIG. 4, when the STA multi-link device cannot send the probe request frame through the second link, the STA multi-link device can obtain, in time, the communication information of the AP working on the second link. In addition, the STA multi-link device sends the probe request frame only on the first link, and only needs to focus on a status of the first link. This is easy to manage. In addition, because only a response frame on the first link needs to be monitored, power consumption of the STA multi-link device can be reduced. In addition, if the STA multi-link device needs to be associated with the AP multi-link device on a plurality of links, the STA multi-link device does not need to send the probe request frame on each of the plurality of links, so that transmission overheads are reduced.

The following describes in detail specific implementations in which the first indication information indicates the AP multi-link device that needs to feed back the communication information.

The first indication information includes a first field. The first field indicates the AP multi-link device that needs to feed back the communication information of the AP working on the at least one link. The first field indicates, in the following five manners, the AP multi-link device that needs to feed back the communication information:

Manner 1: The first field carries an address of the AP multi-link device. To be specific, the first field indicates, by using the address of the AP multi-link device, the AP multi-link device that needs to feed back the communication information of the AP working on the at least one link. Optionally, the address of the AP multi-link device may be a MAC address, a MAC SAP (service access point, service access point) address, or the like.

For example, as shown in FIG. 2, the STA multi-link device sends a probe request frame through link 1. The probe request frame includes a first field, and the first field carries an address of AP multi-link device 1. After receiving the probe request frame, AP multi-link device 1 determines that the address, carried in the first field, of the AP multi-link device is the same as an address of AP multi-link device 1. In this case, AP multi-link device 1 sends a probe response frame on link 1. The probe response frame carries communication information of AP 1 to AP 3 in AP multi-link device 1.

After receiving the probe request frame, AP multi-link device 2 determines that the address, carried in the first field, of the AP multi-link device is different from an address of AP multi-link device 2. In this case, the AP multi-link device 2 sends a probe response frame on link 1. The probe response frame carries communication information of AP 4 in AP multi-link device 1. Alternatively, AP multi-link device 2 may not return the probe response frame.

In a possible implementation, the first field may be referred to as a multi-link device address field, a target multi-link device address field, an AP multi-link device address field, a device address field, or an address field, or may be referred to as another name.

The first field may be in an information element (information element), or the first field may not be in an information element.

Figure 5:
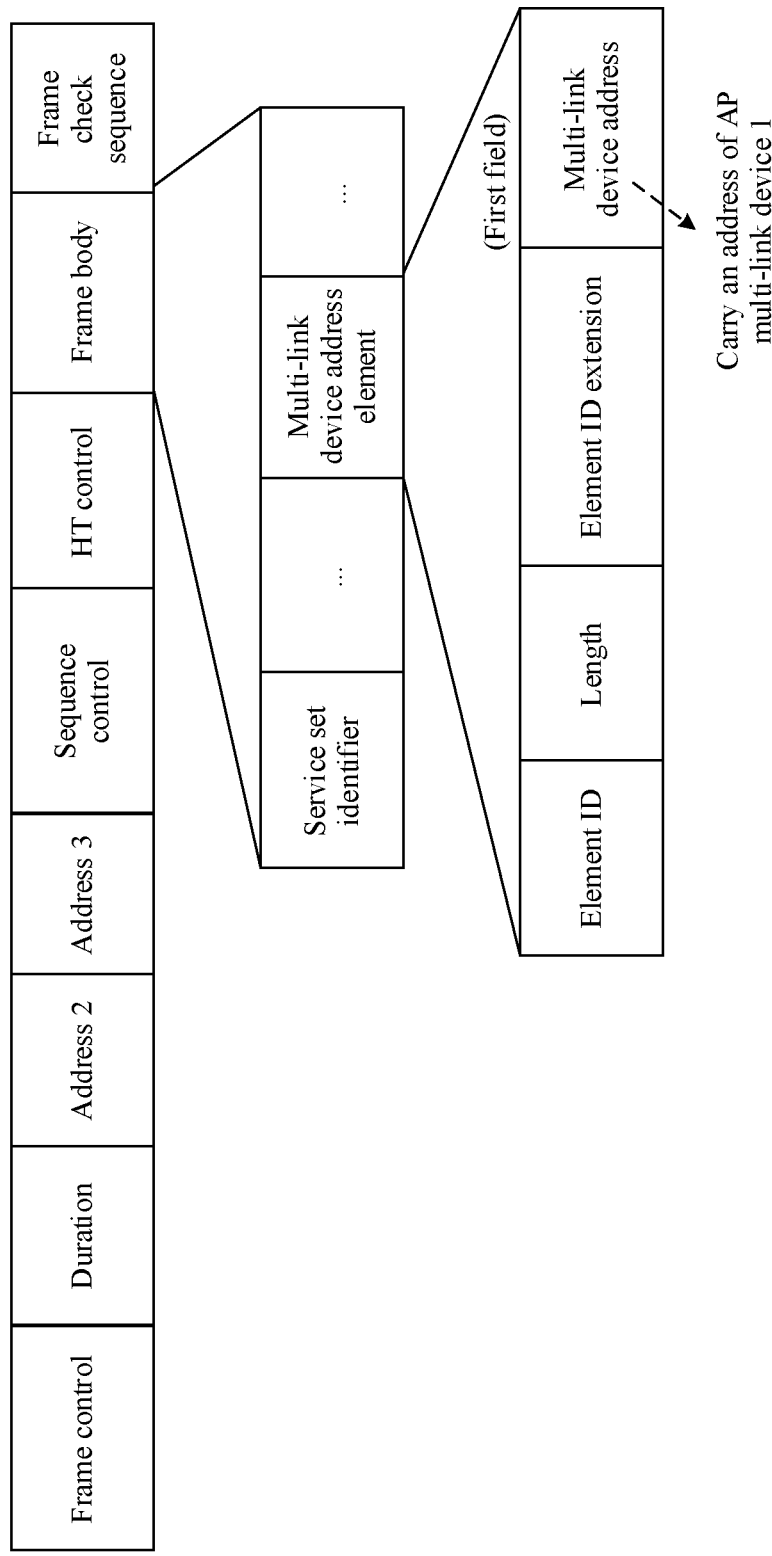
FIG. 5 is a schematic diagram of a frame structure of a probe request frame according to an embodiment of this application.

For example, the first field is in the information element. FIG. 5 is a schematic diagram of a frame structure of the probe request frame. As shown in FIG. 5, a multi-link device address element (MLD address element) may be added to a frame body (frame body) of the probe request frame. The multi-link device address element includes an element identifier (element ID) field, a length (length) field, an element identifier extension (element ID extension) field, and a multi-link device address (MLD address) field. As shown in FIG. 5, the first field is a multi-link device address field, and the multi-link device address field carries the address of AP multi-link device 1. Certainly, the multi-link device address element may alternatively be added to another location of the probe request frame, for example, another location of the frame body, or may be added outside the frame body. This is not limited in this embodiment of this application.

Figure 6:
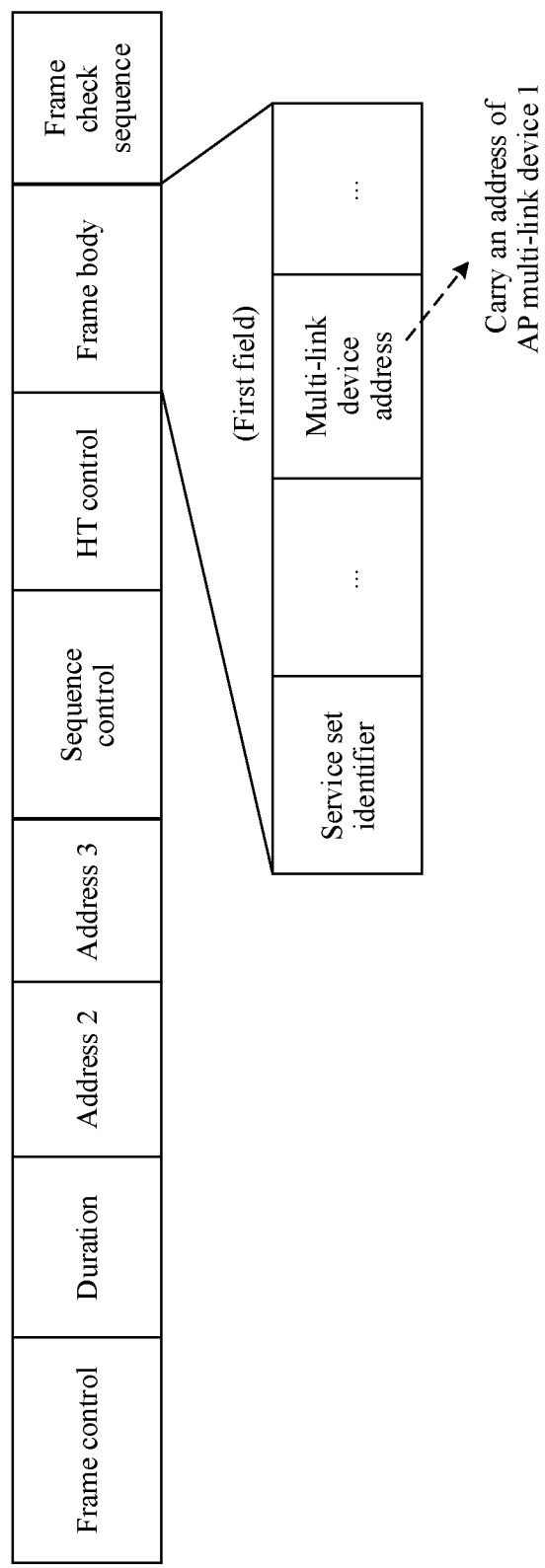
FIG. 6 is a schematic diagram of a frame structure of another probe request frame according to an embodiment of this application.

For another example, the first field is not in the information element. FIG. 6 is a schematic diagram of another frame structure of the probe request frame. As shown in FIG. 6, a multi-link device address (MLD address) field may be added to the frame body of the probe request frame. The first field is a multi-link device address field, and the multi-link device address field carries the address of AP multi-link device 1. Certainly, the multi-link device address field may alternatively be added to another location of the probe request frame, for example, another location of the frame body, or may be added outside the frame body. This is not limited in this embodiment of this application.

In a possible implementation, the first field is in a multi-link element (multi-link element) of the probe request frame, that is, the first field is in an existing information element in a standard. The first field is carried by using an existing information element in the standard, and a new information element does not need to be additionally defined. The change to the standard is small, and is easier to implement.

Optionally, the first field is a multi-link device address (MLD address) field in the multi-link element. That is, an existing multi-link device address field in an existing standard is used to indicate the AP multi-link device that needs to feed back the communication information (that is, the communication information of the AP working on the at least one link). The address of the AP multi-link device is carried by using an existing field in the standard, and a new field does not need to be additionally defined. The change to the standard is small, and is easier to implement.

Figure 7:
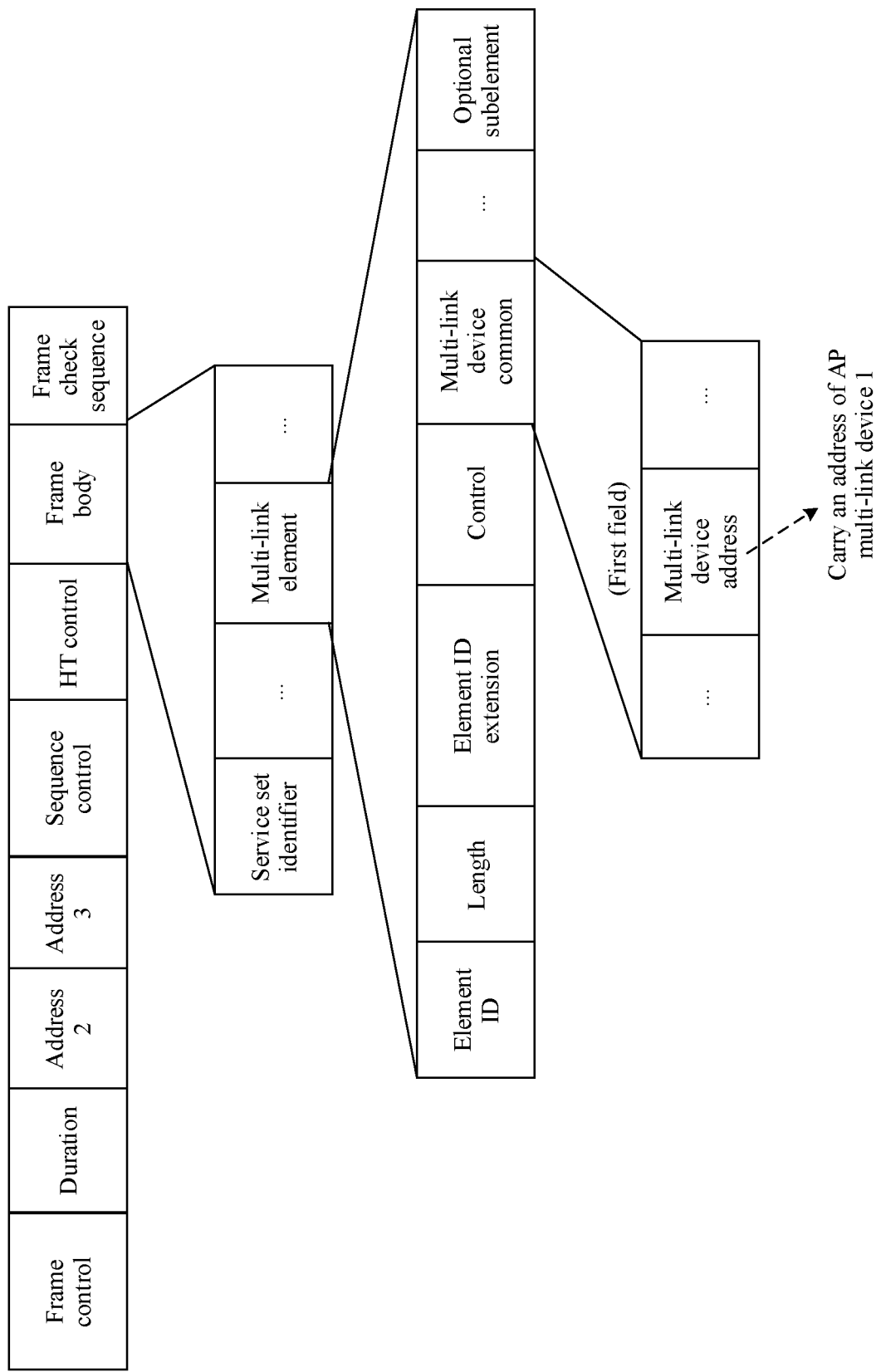
FIG. 7 is a schematic diagram of a frame structure of still another probe request frame according to an embodiment of this application.

For example, FIG. 7 is a schematic diagram of another frame structure of the probe request frame. As shown in FIG. 7, the probe request frame includes a multi-link element (multi-link element). The first field is a multi-link device address (MLD address) field in a multi-link device common (MLD common) field. A difference among FIG. 5, FIG. 6, and FIG. 7 lies in that the multi-link device address field in FIG. 5 and FIG. 6 is a newly added field, and the newly added field is used to indicate the AP multi-link device that needs to feed back the communication information. The multi-link device address field in FIG. 7 is an existing field in the standard. In the existing standard, the multi-link device address field in the multi-link device common field is used to carry an address of the STA multi-link device. In this embodiment of this application, the multi-link device address field in the multi-link device common field is used to carry an address of the AP multi-link device that needs to feed back the communication information of the AP working on the at least one link. To be specific, the multi-link device address field in the multi-link device common field is used to indicate an AP multi-link device that needs to feed back the communication information of the AP working on the at least one link.

Optionally, when the first field is the multi-link device address field in the multi-link element, the probe request frame further carries second indication information, and the second indication information indicates that the multi-link device address field is used to indicate the AP multi-link device that needs to feed back the communication information of the AP working on the at least one link. Based on this optional manner, the AP multi-link device can accurately identify content carried in the multi-link device address field.

Figure 8:
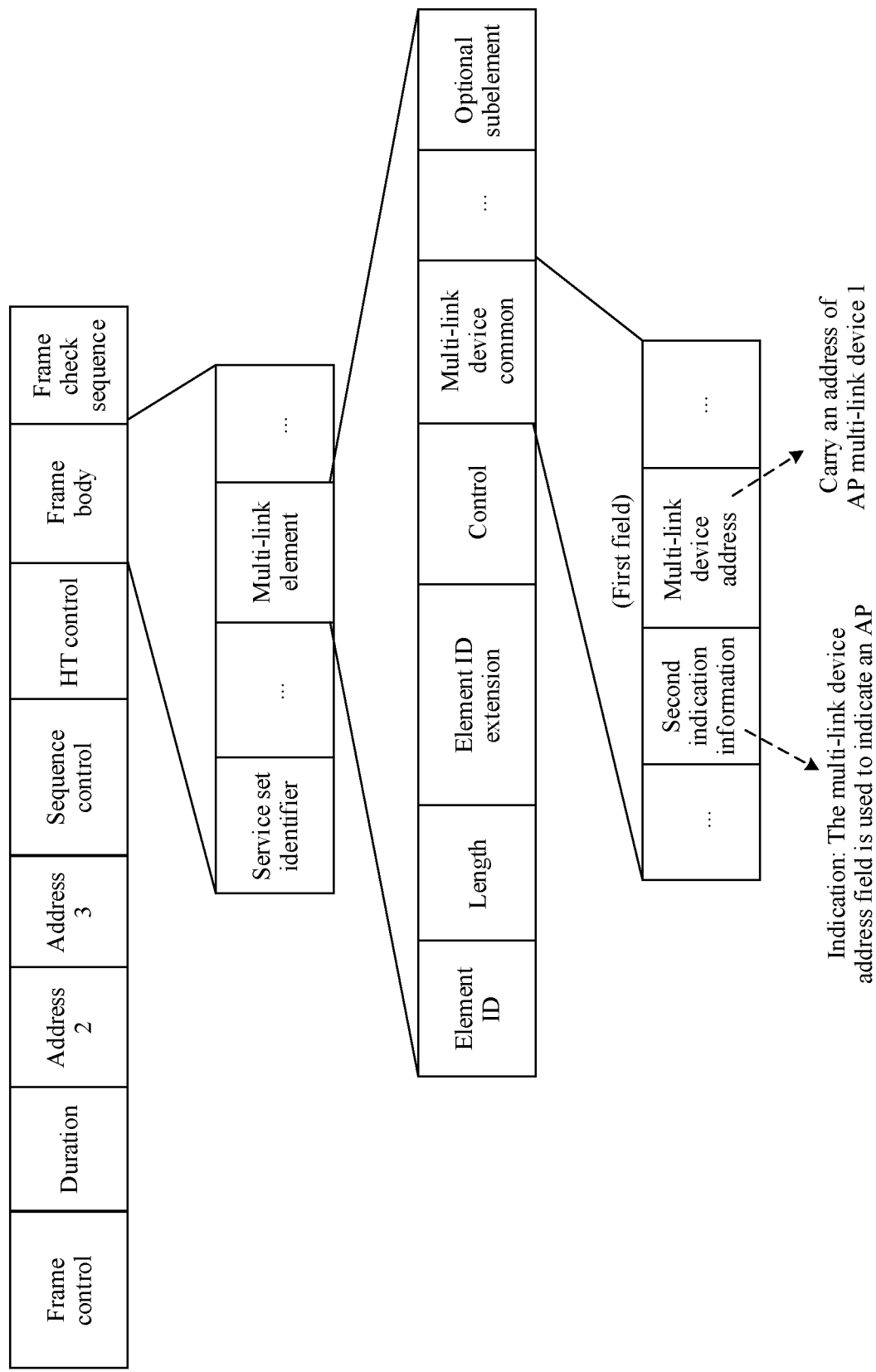
FIG. 8 is a schematic diagram of a frame structure of still another probe request frame according to an embodiment of this application.

For example, as shown in FIG. 8, the probe request frame further carries second indication information, where the second indication information is located before the multi-link device address field. After detecting the second indication information, the AP multi-link device can distinguish the content carried in the multi-link device address field. For example, the second indication information may be 1 bit. If a value of the second indication information is 1, it indicates that the multi-link device address field is used to indicate the AP multi-link device that needs to feed back the communication information of the AP working on the at least one link. That is, the multi-link device address field carries the address of the AP multi-link device that needs to feed back the communication information of the AP working on the at least one link. After identifying that the bit value of the second indication information is 1, the AP multi-link device identifies whether the address carried in the multi-link device address field is the same as an address of the AP multi-link device. If the addresses are the same, the AP multi-link device feeds back the communication information of the AP working on the at least one link. Optionally, if the bit value of the second indication information is 0, it indicates that the multi-link device address field carries an address of an AP multi-link device that does not need to perform feedback. For example, it indicates that the multi-link device address field carries the address of the STA multi-link device.

Optionally, when the first field is the multi-link device address field in the multi-link element, the multi-link element does not carry an optional subelement, to indicate that the multi-link device address field is used to indicate the AP multi-link device that needs to feed back the communication information of the AP working on the at least one link. Based on this optional manner, the AP multi-link device can accurately identify content carried in the multi-link device address field, and no additional information is added to indicate the content carried in the multi-link device address field, so that signaling overheads can be reduced.

Figure 9:
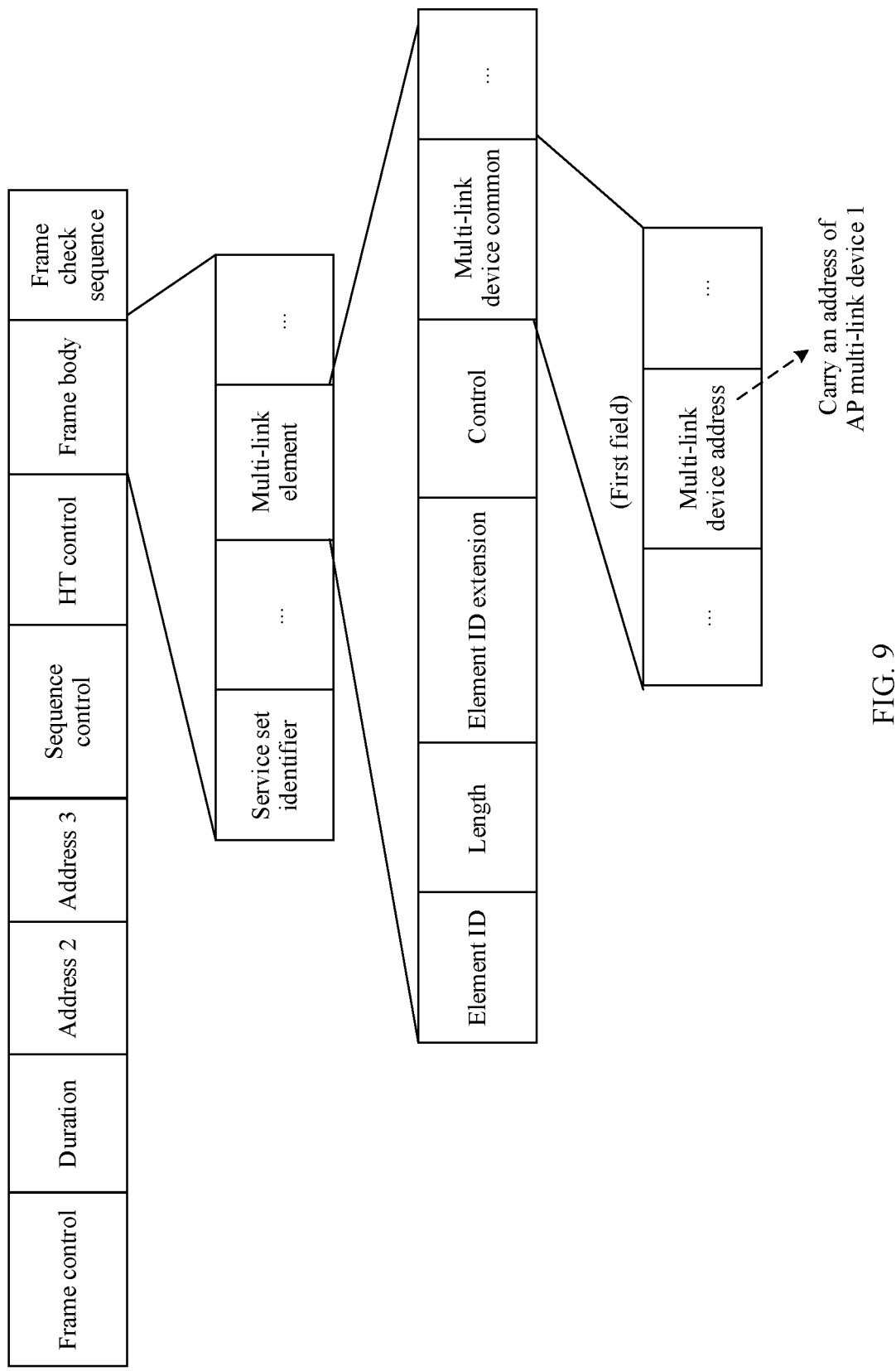
FIG. 9 is a schematic diagram of a frame structure of still another probe request frame according to an embodiment of this application.

For example, as shown in FIG. 9, the multi-link element does not carry an optional subelement. After detecting the multi-link element, if finding that the multi-link element does not carry an optional subelement, the AP multi-link device determines that the multi-link device address field is used to indicate the AP multi-link device that needs to feed back the communication information of the AP working on the at least one link. The AP multi-link device identifies whether the address carried in the multi-link device address field is the same as the address of the AP multi-link device. If the addresses are the same, the AP multi-link device feeds back the communication information of the AP working on the at least one link.

The foregoing describes two manners of distinguishing the content carried in the multi-link device address field. Certainly, a protocol may specify that the multi-link device address field carries only the address of the AP multi-link device. In this case, the AP multi-link device may consider by default that the multi-link device address field carries the address of the AP multi-link device, and no other additional information is required to indicate the content carried in the multi-link device address field.

Figure 10:
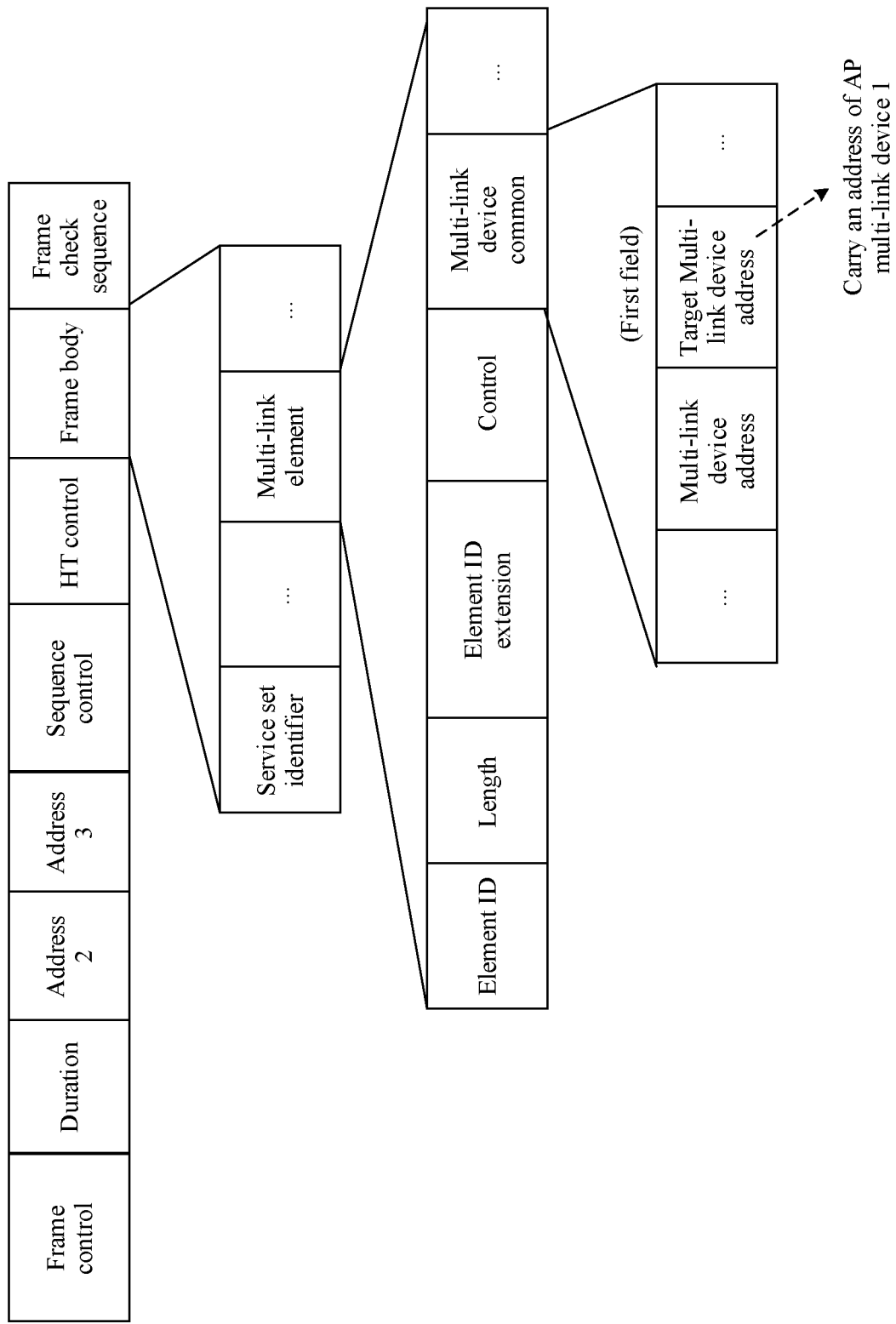
FIG. 10 is a schematic diagram of a frame structure of still another probe request frame according to an embodiment of this application.

Optionally, the first field may not be the multi-link device address field in the multi-link element. For example, as shown in FIG. 10, a target multi-link device address field may be added to the multi-link device common field in the multi-link element to carry the address of the AP multi-link device 1. In this case, additional signaling does not need to be carried to distinguish content carried in an existing multi-link address field in the standard.

The following describes a case in which the first indication information includes a plurality of first fields, and each first field carries an address of an AP multi-link device.

For example, as shown in FIG. 2, the STA multi-link device sends a probe request frame through link 1. The probe request frame includes first field 1 and first field 2. First field 1 carries an address of AP multi-link device 1, and first field 2 carries an address of AP multi-link device 2. After receiving the probe request frame, AP multi-link device 1 determines that an address, carried in first field 1, of an AP multi-link device includes the address of AP multi-link device 1. In this case, AP multi-link device 1 sends a probe response frame on link 1. The probe response frame carries communication information of AP 1 to AP 3.

After receiving the probe request frame, AP multi-link device 2 determines that an address, carried in first field 2, of an AP multi-link device includes the address of AP multi-link device 2. In this case, AP multi-link device 2 sends a probe response frame on link 1. The probe response frame carries communication information of AP 4 and AP 5.

In a possible implementation, a plurality of first fields may be in a multi-link device address list element. The multi-link device address list element may also be referred to as a target multi-link device address list element, an AP multi-link device address list element, a device address list element, or an address list element, or may be referred to as another name.

Figure 11:
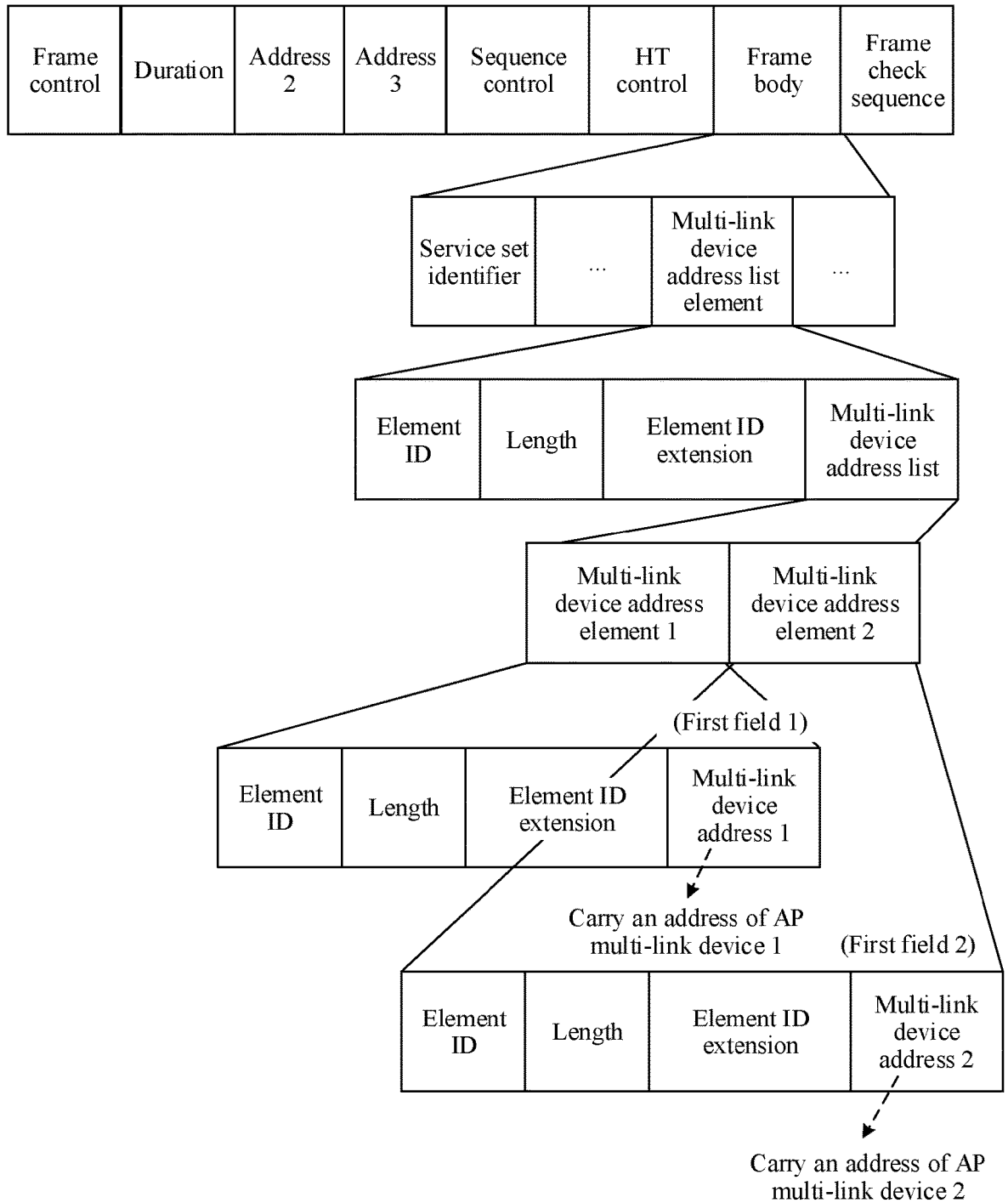
FIG. 11 is a schematic diagram of a frame structure of still another probe request frame according to an embodiment of this application.
Figure 12:
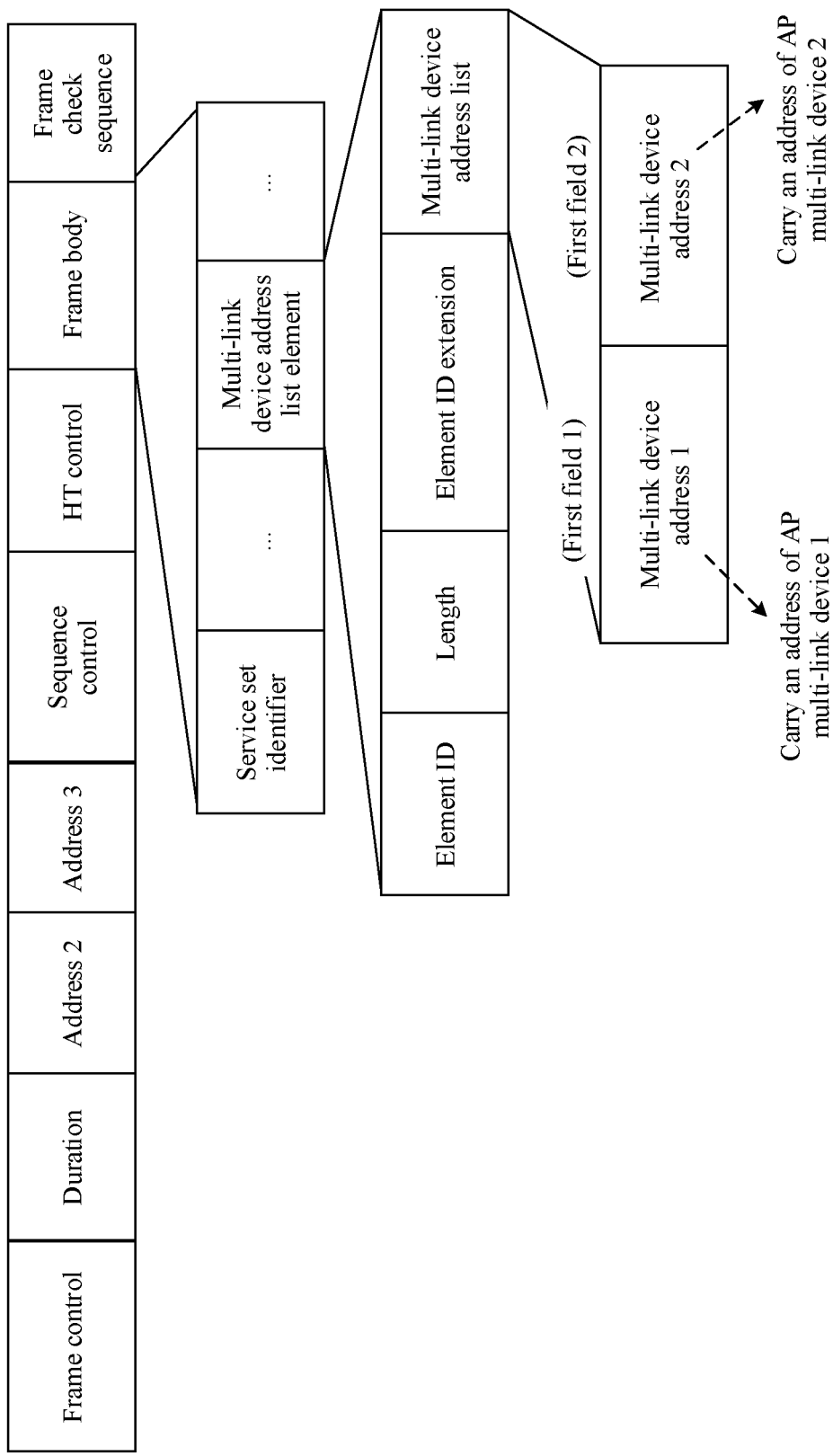
FIG. 12 is a schematic diagram of a frame structure of still another probe request frame according to an embodiment of this application.

For example, FIG. 11 is a schematic diagram of a frame structure of the probe request frame. As shown in FIG. 11, a multi-link device address list element may be added to the frame body of the probe request frame. The multi-link device address list element includes an element identifier (element ID) field, a length (length) field, an element identifier extension (element ID extension) field, and a multi-link device address list (MLD address list) field. As shown in FIG. 11, the multi-link device address list field carries multi-link device address element 1 and multi-link device address element 2. Multi-link device address element 1 carries multi-link device address field 1, that is, first field 1. Multi-link device address element 2 carries multi-link device address field 2, that is, first field 2. Certainly, the multi-link device address list element may alternatively be added to another location of the probe request frame, for example, another location of the frame body, or may be added outside the frame body. This is not limited in this embodiment of this application. Alternatively, multi-link device address field 1 is not in multi-link device address element 1, and multi-link device address field 2 is not in multi-link device address element 2, for example, as shown in FIG. 12.

In a possible implementation, a plurality of first fields may be in a multi-link device address list field. The multi-link device address list field may also be referred to as a target multi-link device address list field, an AP multi-link device address list field, a device address list field, or an address list field, or may be referred to as another name. The probe request frame further carries address quantity indication information, used to indicate a quantity of multi-link device addresses carried in the multi-link device address list field. In this case, the AP multi-link device accurately obtains a multi-link device address carried in the multi-link device address list field.

Figure 13:
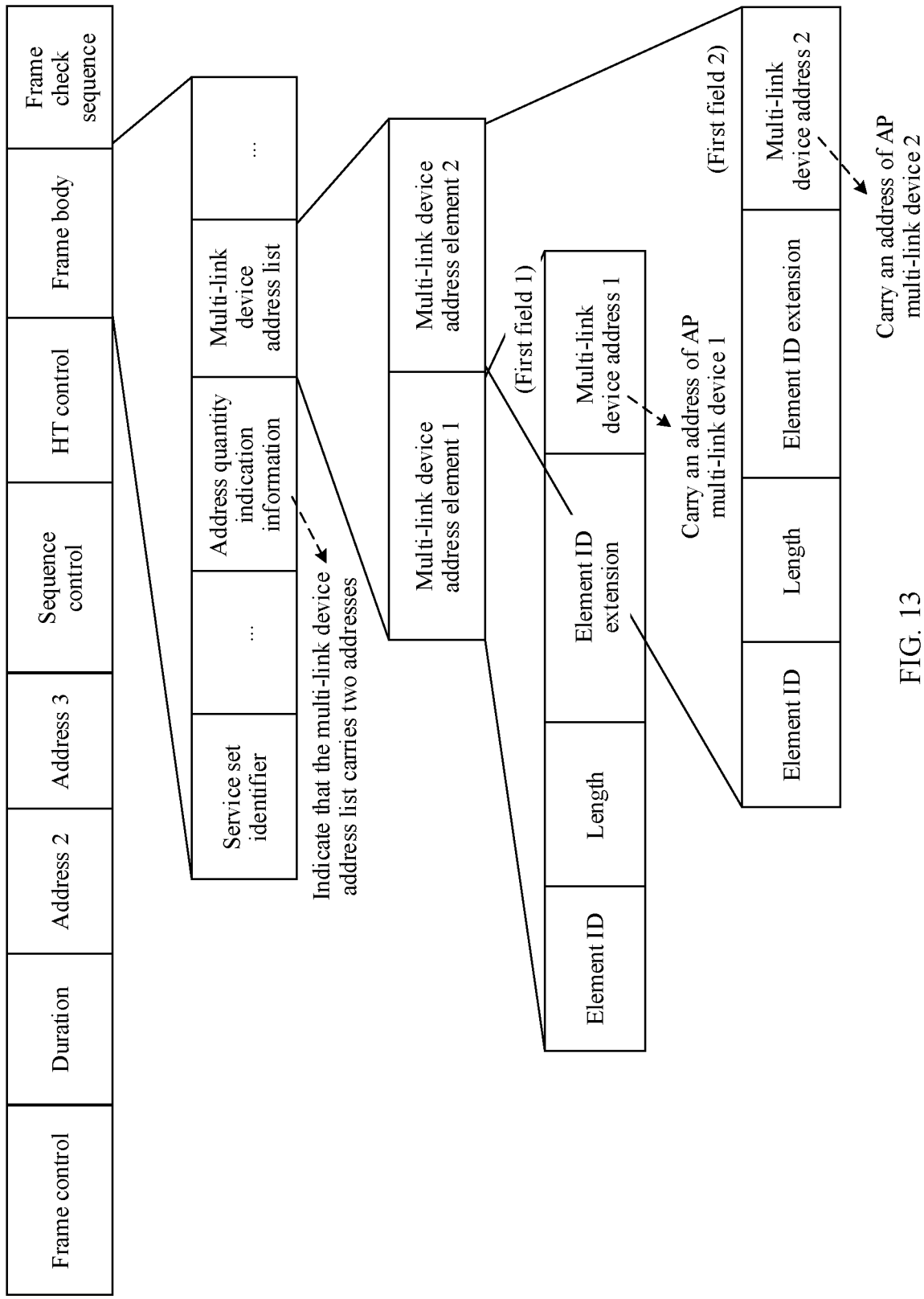
FIG. 13 is a schematic diagram of a frame structure of still another probe request frame according to an embodiment of this application.
Figure 14:
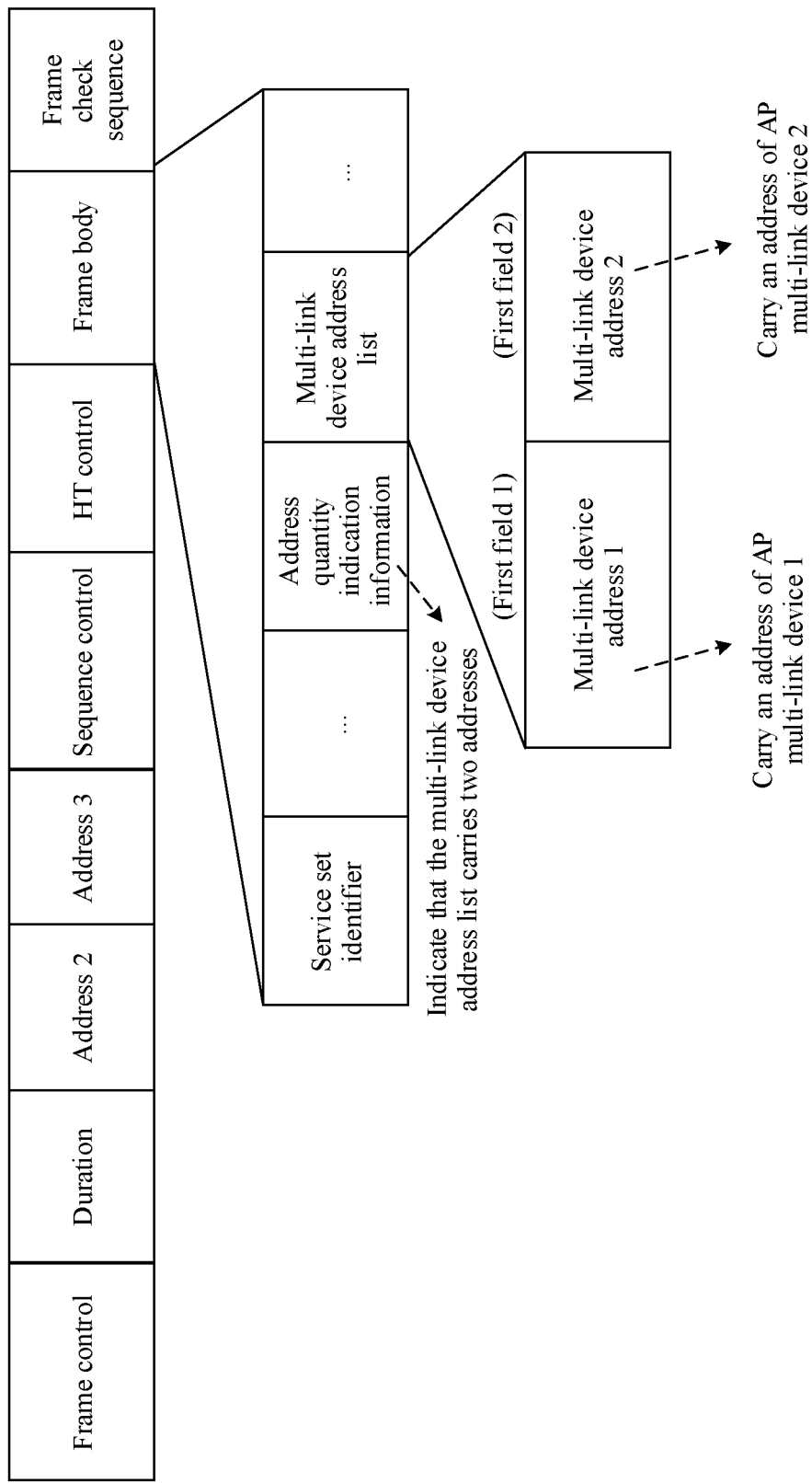
FIG. 14 is a schematic diagram of a frame structure of still another probe request frame according to an embodiment of this application.

For example, FIG. 13 is a schematic diagram of a frame structure of the probe request frame. As shown in FIG. 13, a multi-link device address list field and address quantity indication information may be added to the frame body of the probe request frame. The multi-link device address list field includes multi-link device address element 1 and multi-link device address element 2. Multi-link device address element 1 carries multi-link device address field 1, that is, first field 1. Multi-link device address element 2 carries multi-link device address field 2, that is, first field 2. Certainly, the multi-link device address list field may alternatively be added to another location of the probe request frame, for example, another location of the frame body, or may be added outside the frame body. This is not limited in this embodiment of this application. Alternatively, multi-link device address field 1 is not in multi-link device address element 1, and multi-link device address field 2 is not in multi-link device address element 2, for example, as shown in FIG. 14. Optionally, the probe request frame may not carry the address quantity indication information. For example, the quantity of addresses carried in the multi-link device address list field is a fixed value, and no additional signaling is required to indicate the quantity of addresses carried in the multi-link device address list field.

Figure 15:
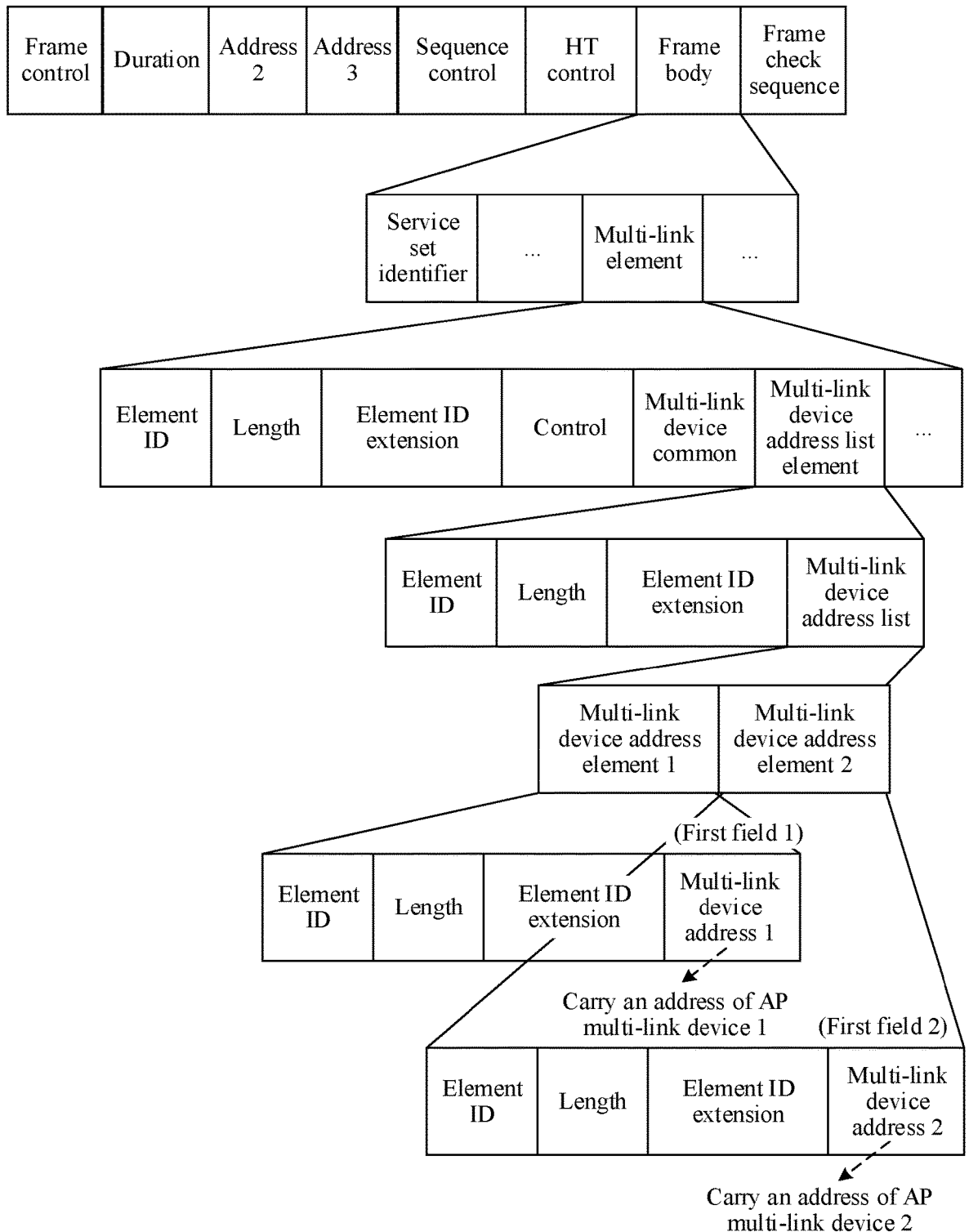
FIG. 15 is a schematic diagram of a frame structure of still another probe request frame according to an embodiment of this application.
Figure 16:
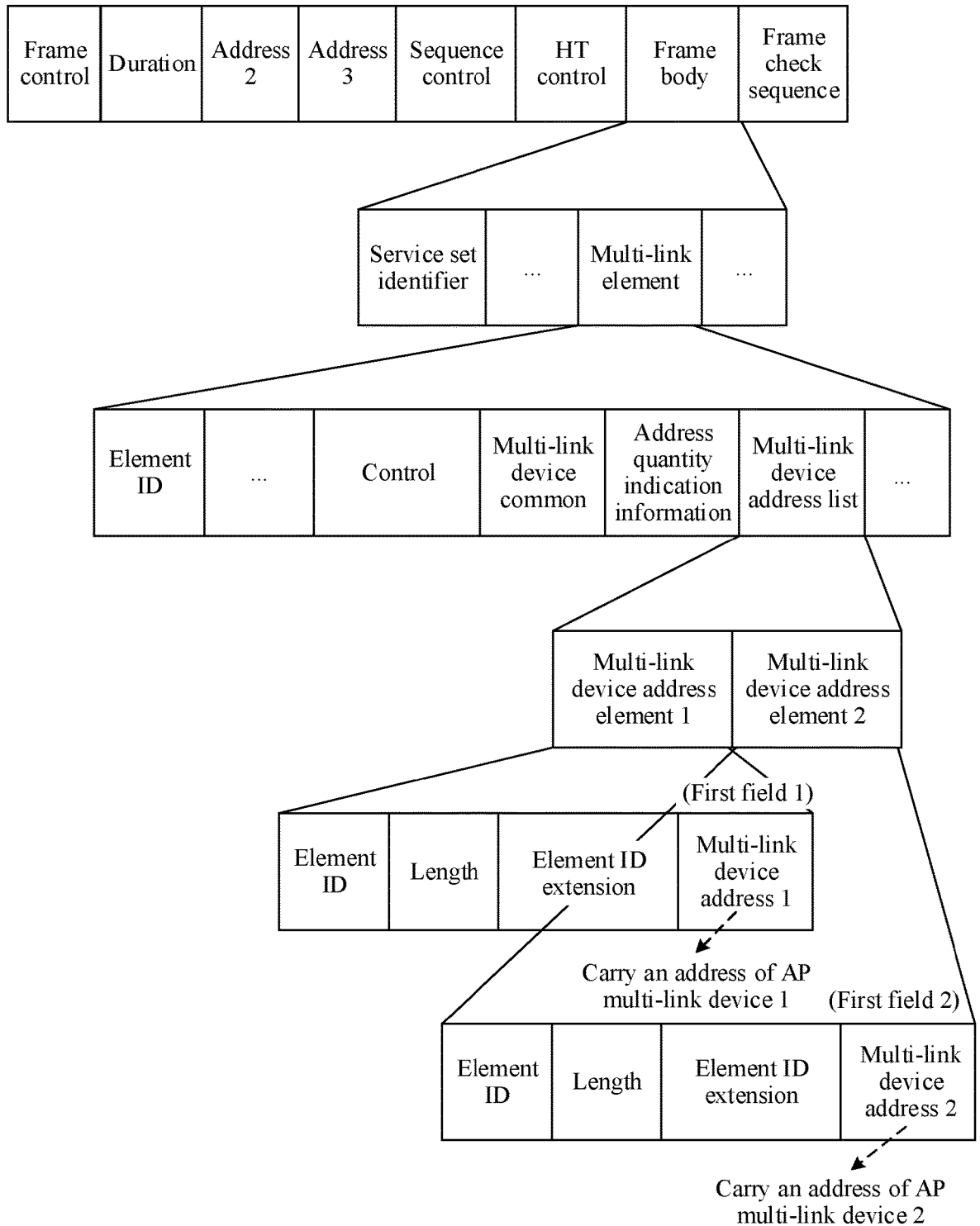
FIG. 16 is a schematic diagram of a frame structure of still another probe request frame according to an embodiment of this application.

In a possible implementation, a plurality of first fields may be in a multi-link element (multi-link element) field of the probe request frame, for example, as shown in FIG. 15 and FIG. 16.

In a possible implementation, the plurality of first fields may not be in a same multi-link element. For example, first field 1 is in multi-link element 1, and first field 2 is in multi-link element 2.

Manner 2: The first field carries an identifier (ID or index) of the AP multi-link device. To be specific, the first field indicates, by using the identifier of the AP multi-link device, the AP multi-link device that needs to feed back the communication information of the AP working on the at least one link.

Optionally, a length of the identifier of the AP multi-link device may be less than a length of an address of the AP multi-link device. For example, the length of the address of the AP multi-link device is generally 48 bits, and the length of the identifier of the AP multi-link device may be 8 bits, 4 bits, or the like. Optionally, a part of the address of the AP multi-link device may be used as the identifier of the AP multi-link device, or the identifier of the AP multi-link device may be obtained based on other information. Optionally, the identifier of the AP multi-link device may be obtained by the STA multi-link device from the AP multi-link device in advance, or obtained by the STA multi-link device in another manner. This is not limited in this embodiment of this application.

A specific implementation principle of indicating, by the first field by using the identifier of the AP multi-link device, the AP multi-link device that needs to feed back the communication information of the AP working on the at least one link is the same as a specific implementation principle of indicating by the first field by using the address of the AP multi-link device, the AP multi-link device that needs to feed back the communication information of the AP working on the at least one link in Manner 1. Examples are not described herein.

In a possible implementation, the first field may be referred to as a multi-link device identifier field, a target multi-link device identifier field, an AP multi-link device identifier field, a device identifier field, or an identifier field, or may be referred to as another name.

The first field may be in an information element (information element), or the first field may not be in an information element. For example, multi-link device addresses in FIG. 5 and FIG. 6 may be replaced with multi-link device identifiers.

In a possible implementation, the first field is in a multi-link element (multi-link element) of the probe request frame, that is, the first field is in an existing information element in a standard. The first field is carried by using an existing information element in the standard, and a new information element does not need to be additionally defined. The change to the standard is small, and is easier to implement. For example, a target multi-link device address in FIG. 10 may be replaced with a multi-link device identifier.

When the first field carries the identifier of the AP multi-link device, the probe request frame may also carry a plurality of first fields, and each first field carries an identifier of an AP multi-link device. A principle of indicating, by the plurality of first fields, a plurality of AP multi-link devices to feed back the communication information of the AP working on the at least one link is the same as a principle of indicating, by a plurality of first fields, a plurality of AP multi-link devices to feed back the communication information of the AP working on the at least one link in Manner 1. Details are not described herein. In addition, for locations of the plurality of first fields in the probe request frame in Manner 2, refer to the descriptions of the locations of the plurality of first fields in the probe request frame in Manner 1. Details are not described herein again.

Manner 3: The first field carries a service set identifier (service set identifier, SSID) of the AP multi-link device. To be specific, the first field indicates, by using the S SID of the AP multi-link device, the AP multi-link device that needs to feed back the communication information of the AP working on the at least one link. The SSID is used to distinguish between different networks. The SSID of the AP multi-link device is a multi-link device level SSID. One AP multi-link device corresponds to one multi-link device level SSID.

A specific implementation principle of indicating, by the first field by using the SSID of the AP multi-link device, the AP multi-link device that needs to feed back the communication information of the AP working on the at least one link is the same as a specific implementation principle of indicating, by the first field by using the identifier of the AP multi-link device, the AP multi-link device that needs to feed back the communication information of the AP working on the at least one link in Manner 2. Examples are not described herein.

In a possible implementation, the first field may be referred to as a multi-link device SSID field, a target multi-link device SSID field, an AP multi-link device SSID field, a device SSID field, or an SSID field, or may be referred to as another name. In Manner 3, a location of the first field in the probe request frame is similar to a location of the first field in the probe request frame in Manner 2. For details, refer to the descriptions of the location of the first field in the probe request frame in Manner 2. Details are not described herein again.

Figure 17:
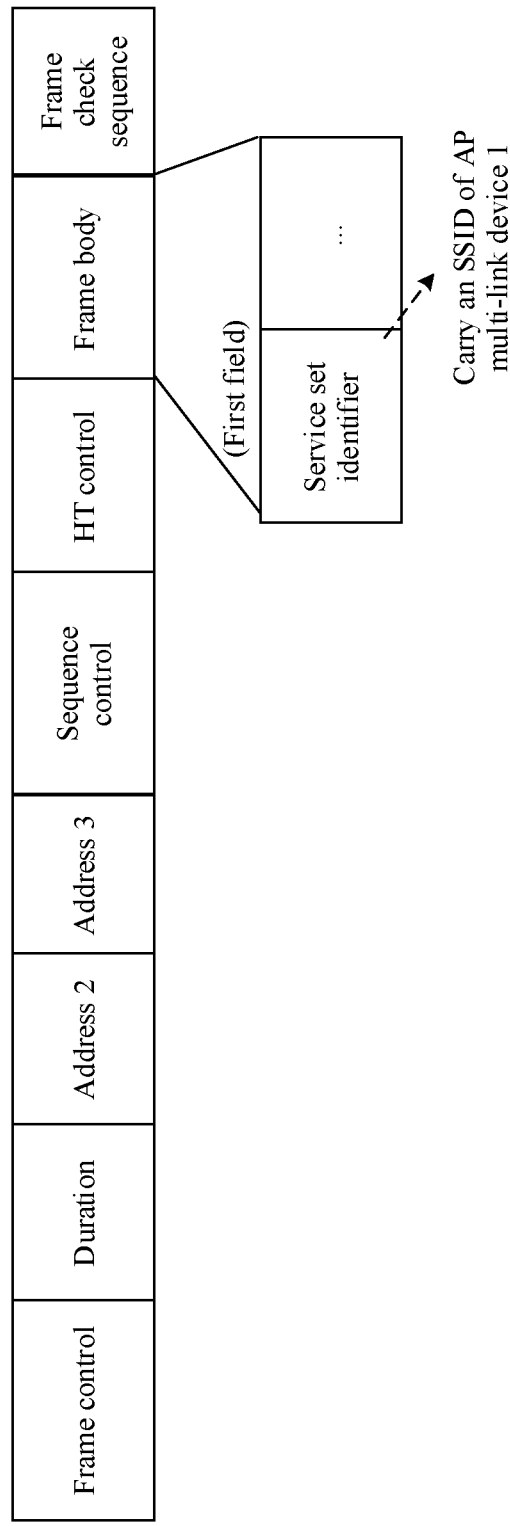
FIG. 17 is a schematic diagram of a frame structure of still another probe request frame according to an embodiment of this application.

In a possible implementation, when the first field carries the SSID of the AP multi-link device, the first field may be an SSID field in the frame body of the probe request frame, for example, as shown in FIG. 17.

Similarly, in Manner 3, when the first field carries the S SID of the AP multi-link device, the probe request frame may also carry a plurality of first fields, and each first field carries an SSID of one AP multi-link device. A principle of indicating, by the plurality of first fields, a plurality of AP multi-link devices to feed back the communication information of the AP working on the at least one link is the same as a principle of indicating, by a plurality of first fields, a plurality of AP multi-link devices to feed back the communication information of the AP working on the at least one link in Manner 1. Details are not described herein. In addition, for locations of the plurality of first fields in the probe request frame in Manner 3, refer to the descriptions of the locations of the plurality of first fields in the probe request frame in Manner 1. Details are not described herein again.

Manner 4: The first field carries an SSID of the AP multi-link device on the first link. To be specific, the first field indicates, by using the SSID of the AP multi-link device on the first link, the AP multi-link device that needs to feed back the communication information of the AP working on the at least one link. In this case, the SSID refers to a link-level SSID, and one AP multi-link device corresponds to one SSID on each link. The link-level SSID may also be referred to as a short multi-link (ML) SSID.

A specific implementation principle of indicating, by the first field by using the SSID of the AP multi-link device on the first link, the AP multi-link device that needs to feed back the communication information of the AP working on the at least one link is the same as a specific implementation principle of indicating, by the first field by using the identifier of the AP multi-link device, the AP multi-link device that needs to feed back the communication information of the AP working on the at least one link in Manner 2. Examples are not described herein.

In a possible implementation, the first field may be referred to as a multi-link device SSID field, a target multi-link device SSID field, an AP multi-link device SSID field, a device SSID field, or an SSID field, or may be referred to as another name. In Manner 4, a location of the first field in the probe request frame is similar to a location of the first field in the probe request frame in Manner 2. For details, refer to the descriptions of the location of the first field in the probe request frame in Manner 2. Details are not described herein again.

Figure 18:
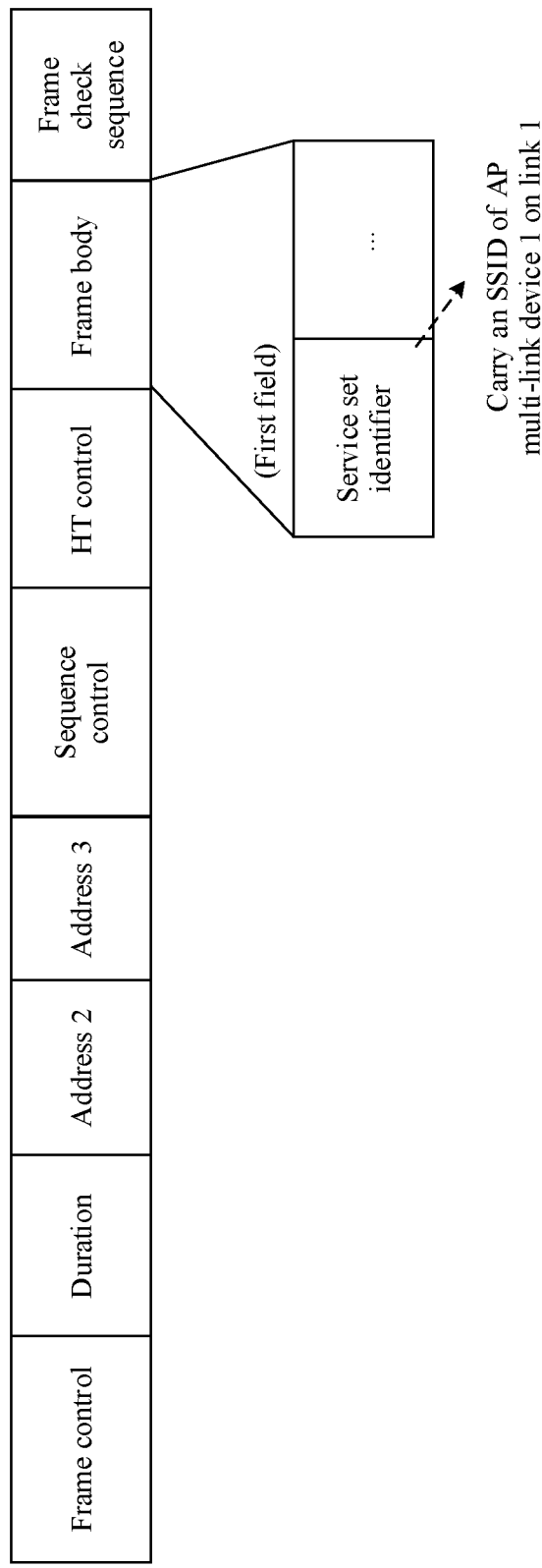
FIG. 18 is a schematic diagram of a frame structure of still another probe request frame according to an embodiment of this application.

In a possible implementation, when the first field carries the SSID of the AP multi-link device on the first link, the first field may be an SSID field in the frame body of the probe request frame, for example, as shown in FIG. 18.

Similarly, in Manner 4, when the first field carries the SSID of the AP multi-link device on the first link, the probe request frame may also carry a plurality of first fields, and each first field carries an SSID of one AP multi-link device on the first link. A principle of indicating, by the plurality of first fields, a plurality of AP multi-link devices to feed back the communication information of the AP working on the at least one link is the same as a principle of indicating, by a plurality of first fields, a plurality of AP multi-link devices to feed back the communication information of the AP working on the at least one link in Manner 1. Details are not described herein. In addition, for locations of the plurality of first fields in the probe request frame in Manner 4, refer to the descriptions of the locations of the plurality of first fields in the probe request frame in Manner 1. Details are not described herein again.

Manner 5: A value of the first field is a preset value, and the first indication information is specifically used to indicate the AP multi-link device that receives the probe request frame to feed back the communication information of the AP working on the at least one link. The preset value may be a special value. For example, values of the first field are all 0 or are all 1. If the AP multi-link device detects that the value of the first field is the special value, the AP multi-link device sends a probe response frame, and includes, to the probe response frame, the communication information of the AP that works on the at least one link and that is in the AP multi-link device. The first field in Manner 5 may be any first field described in Manner 1 to Manner 4. For a location and a name of the first field, refer to the descriptions in Manner 1 to Manner 4. Details are not described herein again. Alternatively, the first field in Manner 5 may not be the first field described in Manner 1 to Manner 4. For example, the name of the first field in Manner 5 may be a wildcard field.

Figure 19:
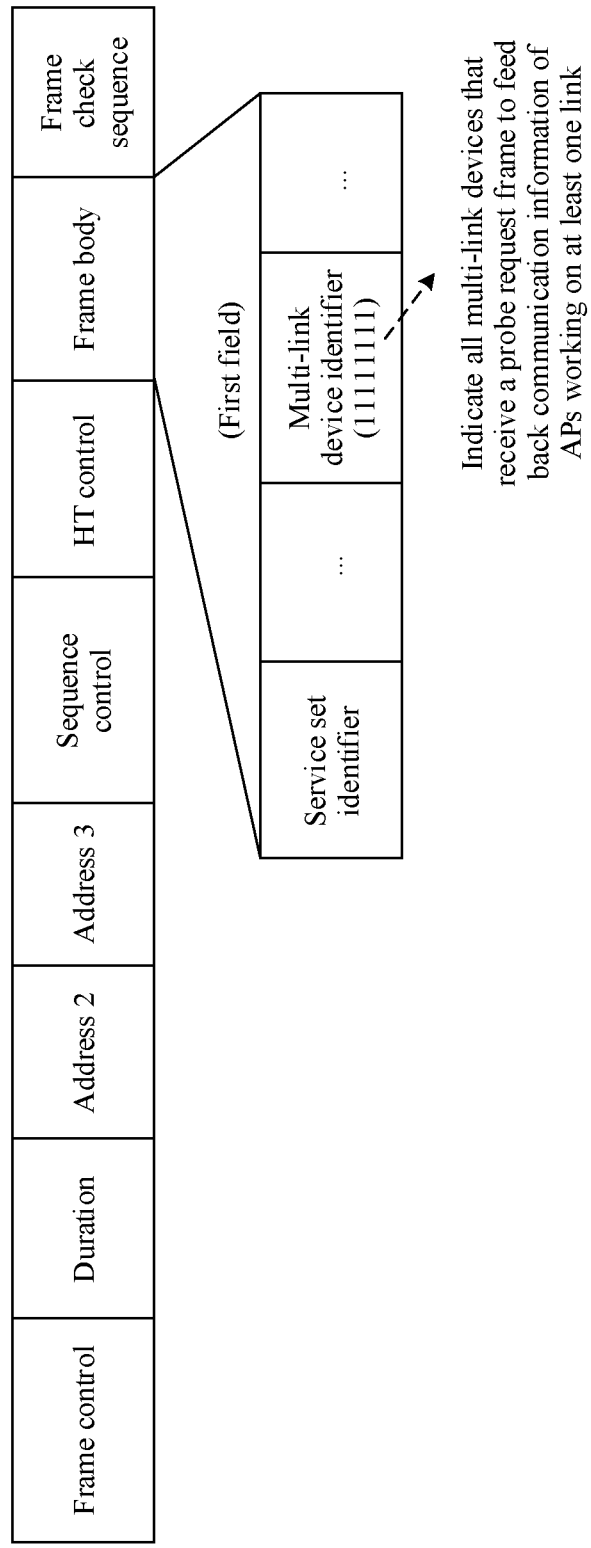
FIG. 19 is a schematic diagram of a frame structure of still another probe request frame according to an embodiment of this application.

For example, the first field is the multi-link device identifier field in Manner 2. As shown in FIG. 19, the multi-link device identifier field has a total of eight bits. If all the bits of the multi-link device identifier field are 1, it indicates all AP multi-link devices that receive the probe request frame to feed back the communication information of the AP working on the at least one link. After receiving the probe request frame, the AP multi-link device needs to feed back the communication information of the AP working on the at least one link. If the bits in the multi-link device identifier field are not all 1, after receiving the probe request frame, the AP multi-link device needs to determine whether the identifier of the AP multi-link device is the same as an identifier carried in the multi-link device identifier field. If the identifiers are the same, the AP multi-link device needs to feed back the communication information of the AP working on the at least one link.

The following describes a specific implementation in which the first indication information indicates a link on which an AP that needs to feed back communication information is located.

In addition to any first field described above, the first indication information further includes a second field, and the second field is used to indicate the at least one link. In other words, the second field is used to indicate that the AP multi-link device needs to feed back communication information of an AP on a specific link. The second field is used to indicate the at least one link, so that the required communication information of the AP can be more flexibly obtained. Certainly, the first indication information may not include the second field, and the AP multi-link device determines to feed back communication information of an AP working a specific link, or the AP multi-link device feeds back, by default, communication information of APs that work on all links and that are in the AP multi-link device.

The second field may indicate the at least one link in the following three manners:

Manner 1: The second field carries a feedback type, and when the feedback type is a first value, the feedback type is used to indicate the AP multi-link device to feed back communication information of APs that work on all links and that are in the AP multi-link device. The feedback type can be indicated by using a few bits, and therefore, indicating a link by using the feedback type helps reduce signaling overheads. Optionally, when the feedback type is a second value, the feedback type is used to indicate the AP multi-link device to feed back communication information of an AP that works on the first link and that is in the AP multi-link device. For example, the feedback type is one bit, and when the value of the feedback type is 1, the feedback type indicates the AP multi-link device to feed back the communication information of the APs that work on all the links and that are in the AP multi-link device. When the value of the feedback type is 0, the feedback type indicates the AP multi-link device to feed back communication information of an AP that works on the first link and that is in the AP multi-link device. Certainly, the feedback type may alternatively be a plurality of bits, for example, two bits or three bits.

Figure 20:
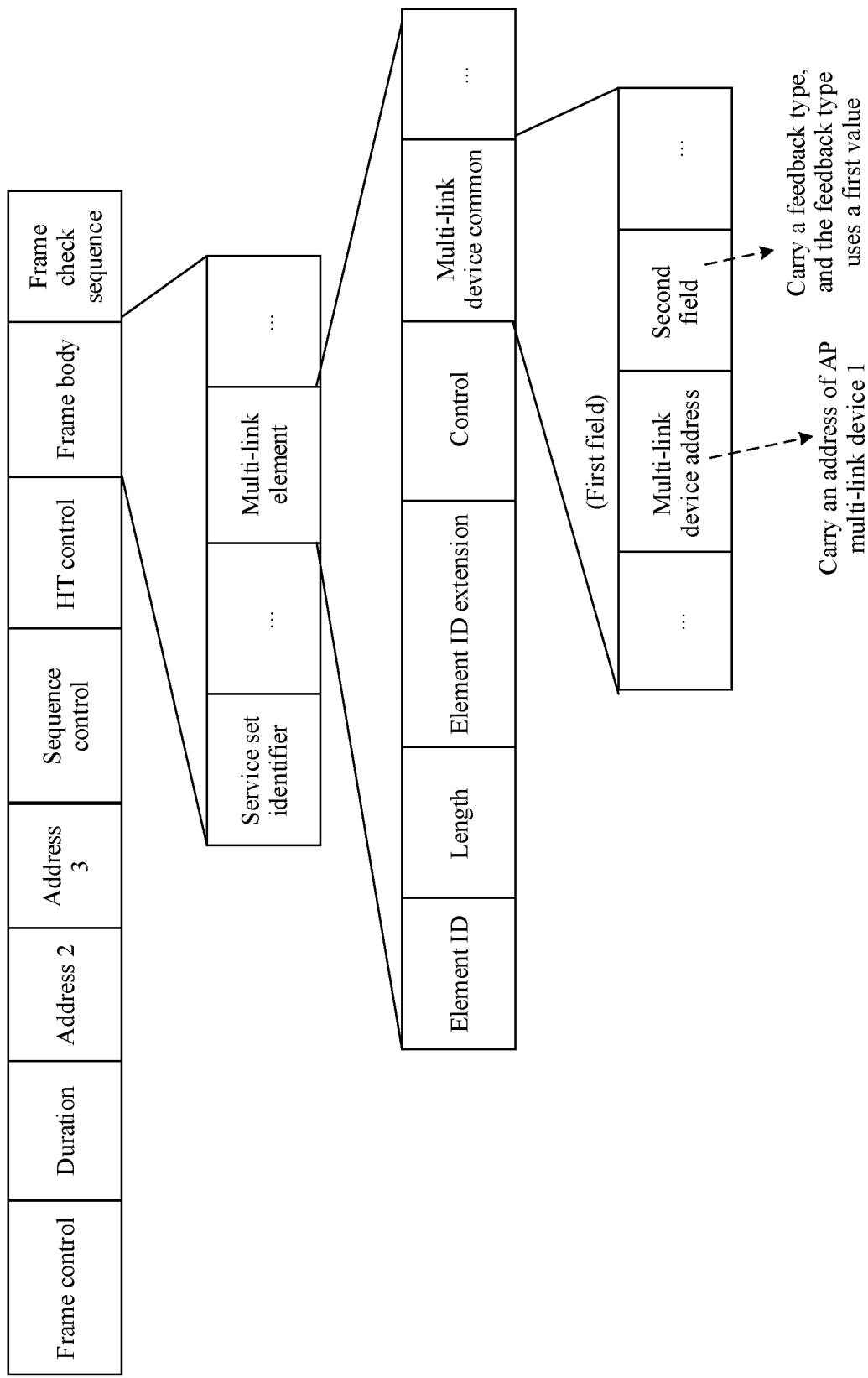
FIG. 20 is a schematic diagram of a frame structure of still another probe request frame according to an embodiment of this application.

In a possible implementation, when the second field carries the feedback type, the second field is in a multi-link element (ML element). Optionally, the second field is in a multi-link device common (MLD common) field of the multi-link element, for example, as shown in FIG. 20. Certainly, the second field may alternatively be outside the multi-link element. This is not limited in this embodiment of this application. Optionally, when the second field carries the feedback type, the second field may be referred to as a feedback type field, a feedback field, a type field, or the like, or certainly may be referred to as another name.

Manner 2: The second field carries an identifier of the at least one link. For example, the second field carries identifiers of link 1 and link 2. After receiving the probe request frame, AP multi-link device 1 feeds back communication information of AP 1 and AP 2. Based on Manner 2, a link can be accurately indicated by using an identifier of the link.

Figure 21:
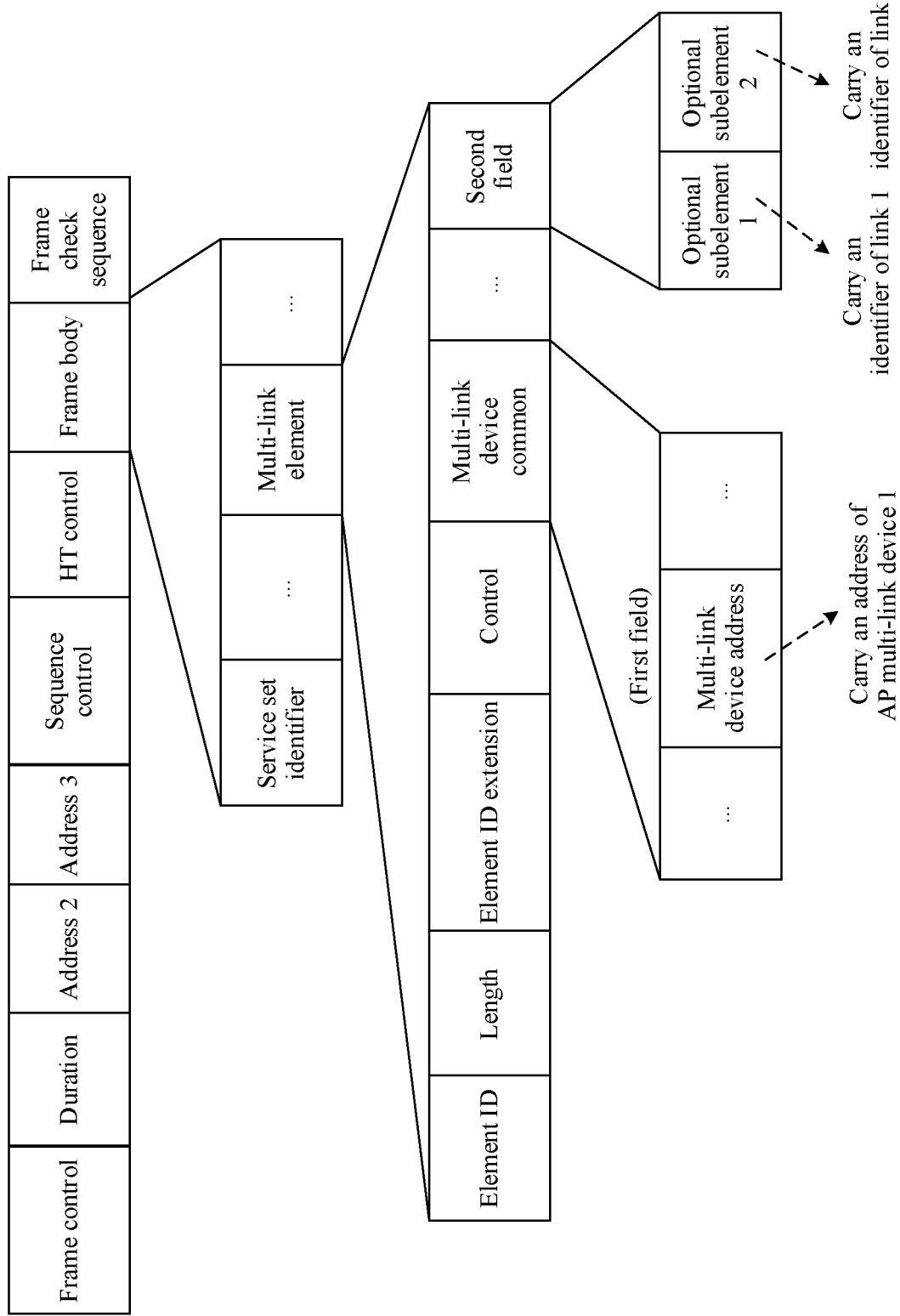
FIG. 21 is a schematic diagram of a frame structure of still another probe request frame according to an embodiment of this application.

In a possible implementation, when the second field carries the identifier of the at least one link, the second field is in a multi-link element (ML element). Optionally, the second field is in a multi-link device common (MLD common) field of the multi-link element. The second field may include one or more optional subelements. Each optional subelement carries an identifier of a link. The identifier of the at least one link is carried by using an existing field, and a new field does not need to be additionally defined. The change to the standard is small, and is easier to implement, for example, as shown in FIG. 21. The second field includes two optional subelements. Optional subelement 1 carries an identifier of link 1, and optional subelement 2 carries an identifier of link 2. After receiving the probe request frame, AP multi-link device 1 feeds back communication information of APs working on link 1 and link 2, that is, feeds back communication information of AP 1 and AP 2.

Optionally, different link identifiers may be indicated to different AP multi-link devices. There may be a plurality of first fields, there may also be a plurality of second fields, and one first field corresponds to one second field. In this way, link identifiers may be more flexibly indicated to different AP multi-link devices.

Figure 22:
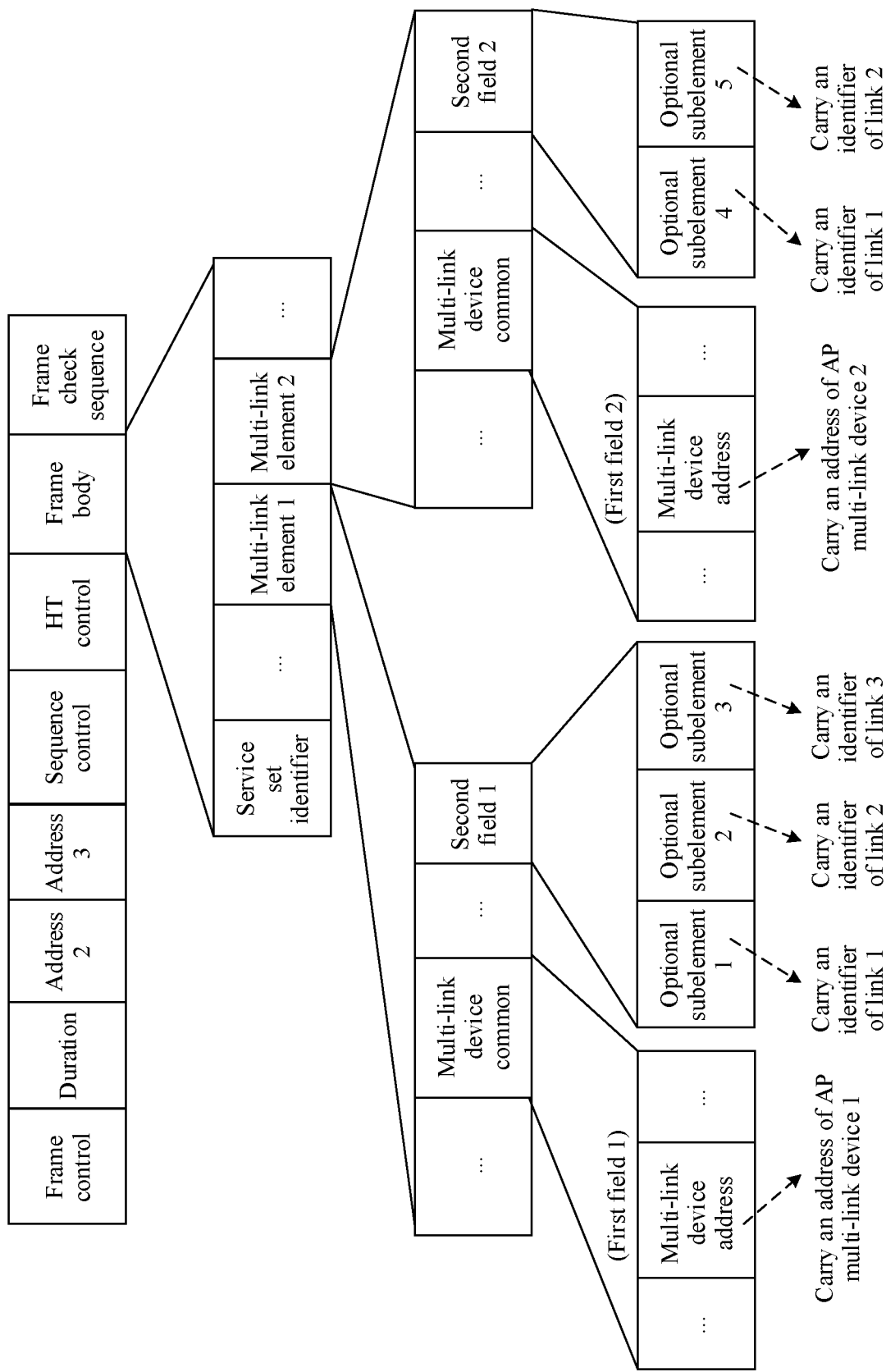
FIG. 22 is a schematic diagram of a frame structure of still another probe request frame according to an embodiment of this application.

For example, as shown in FIG. 22, the probe request frame includes two first fields and two second fields. First field 1 and second field 1 are in multi-link element 1, and first field 2 and second field 2 are in multi-link element 2. Second field 1 includes optional subelement 1 to optional subelement 3. Optional subelement 1 carries an identifier of link 1, optional subelement 2 carries an identifier of link 2, and optional subelement 3 carries an identifier of link 3. Second field 2 includes optional subelement 4 and optional subelement 5. Optional subelement 4 carries the identifier of link 1, and optional subelement 5 carries the identifier of link 2. After receiving the probe request frame, AP multi-link device 1 feeds back communication information of APs working on link 1 to link 3, that is, feeds back communication information of AP 1, AP 2, and AP 3. After receiving the probe request frame, AP multi-link device 2 feeds back communication information of APs working on link 1 and link 2, that is, feeds back communication information of AP 4 and AP 5.

Figure 23:
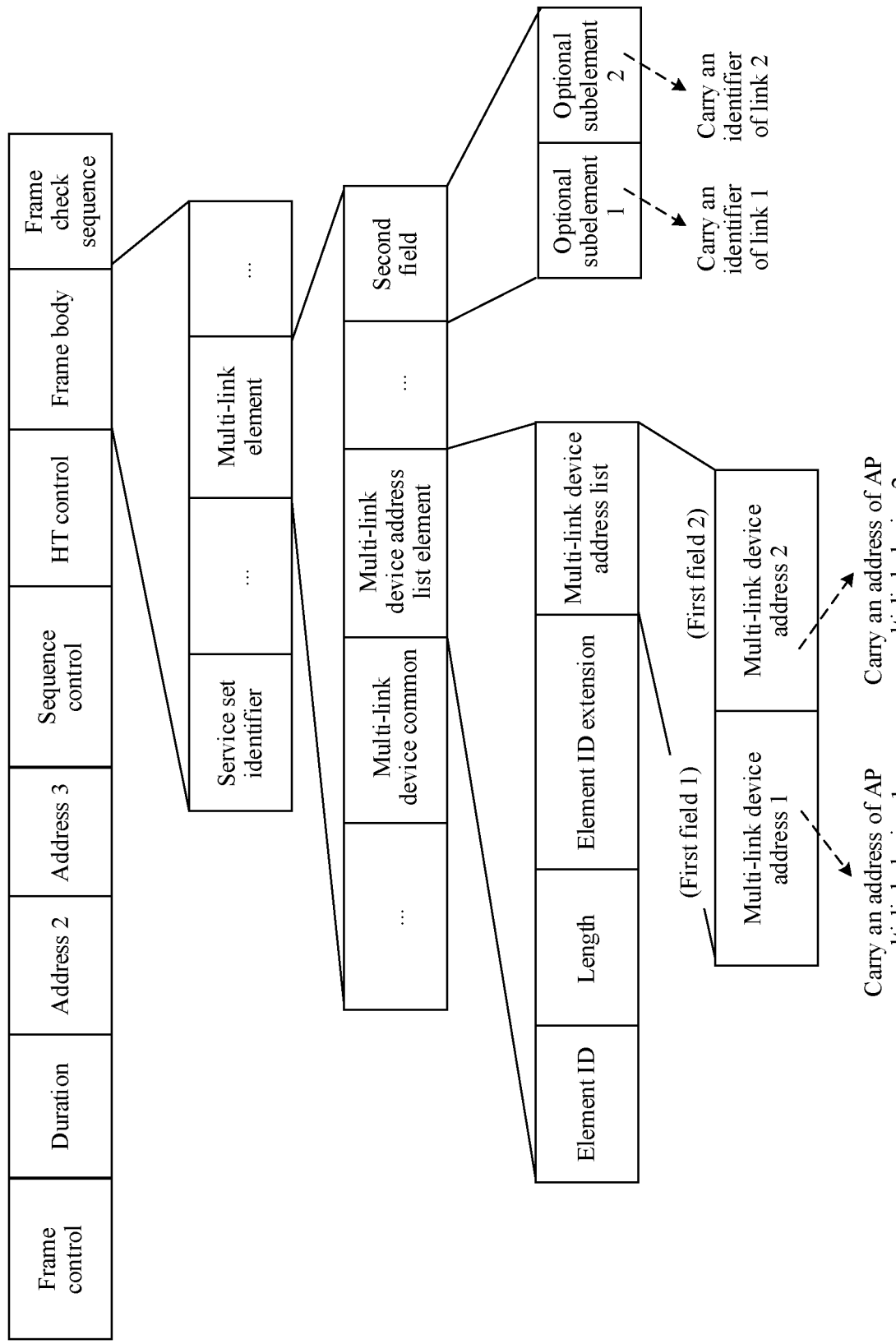
FIG. 23 is a schematic diagram of a frame structure of still another probe request frame according to an embodiment of this application.
Figure 24:
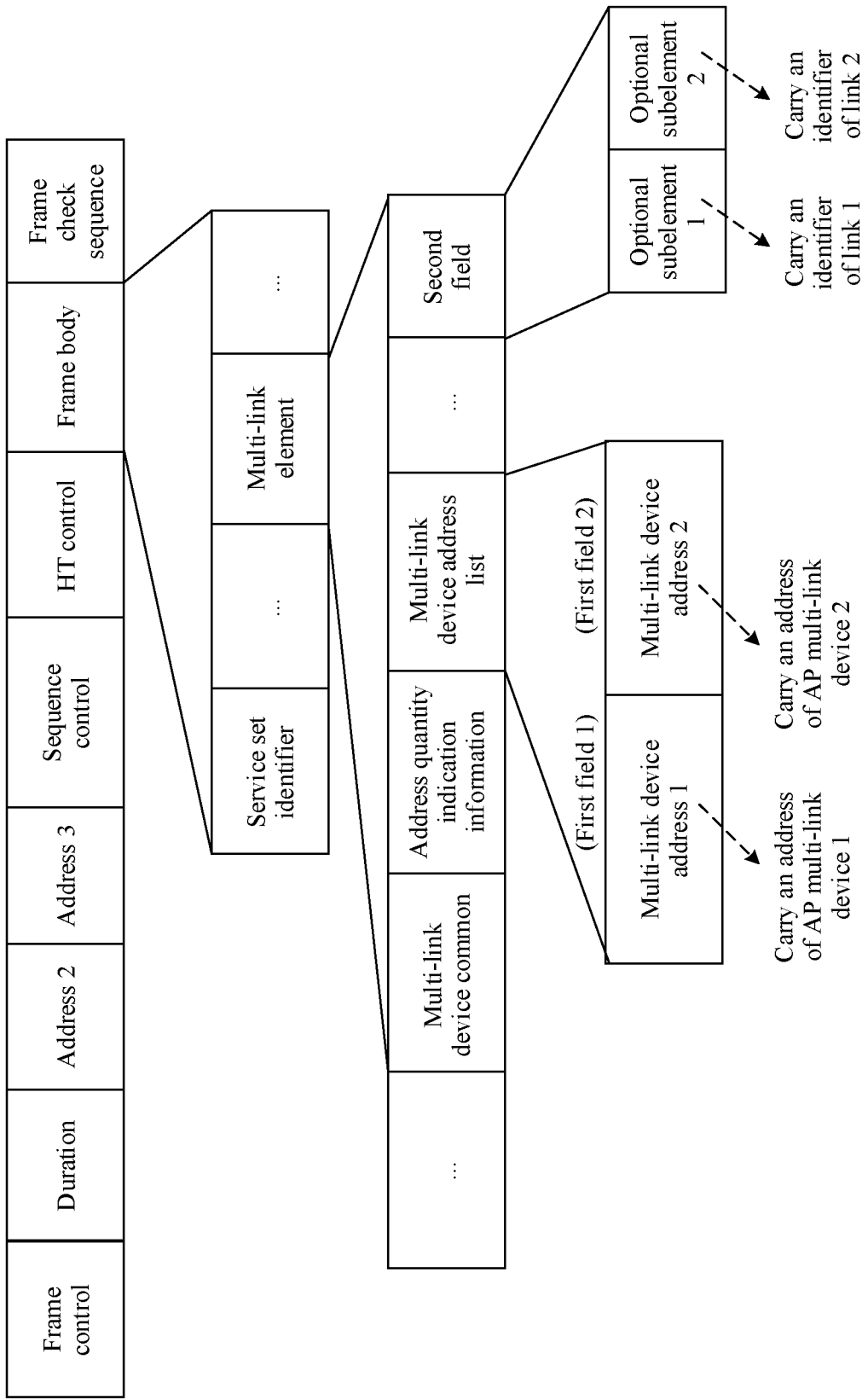
FIG. 24 is a schematic diagram of a frame structure of still another probe request frame according to an embodiment of this application.

Optionally, when there are a plurality of first fields, the plurality of first fields may alternatively correspond to one second field. That is, a same link identifier is indicated to different AP multi-link devices. Only one second field is required to indicate links corresponding to a plurality of AP multi-link devices, so that signaling overheads can be reduced. For example, as shown in FIG. 23 and FIG. 24, the probe request frame includes two first fields and one second field. First field 1, first field 2, and the second field are in a multi-link element. The second field includes optional subelement 1 and optional subelement 2. The optional subelement 1 carries the identifier of the link 1, and the optional subelement 2 carries the identifier of the link 2. After receiving the probe request frame, AP multi-link device 1 feeds back communication information of APs working on link 1 and link 2, that is, feeds back communication information of AP 1 and AP 2. After receiving the probe request frame, AP multi-link device 2 feeds back communication information of APs working on link 1 and link 2, that is, feeds back communication information of AP 4 and AP 5.

Optionally, when the second field carries the identifier of the at least one link, the second field may be referred to as a link identifier field, a link identifier list field, or the like.

Manner 3: The second field carries a bitmap, the bitmap includes bits corresponding to links, a first bit is any bit in the bitmap, and when a value of the first bit is a first value, the first bit indicates the AP multi-link device to feed back communication information of an AP that works on a link corresponding to the first bit and that is in the AP multi-link device, or when the value of the first bit is a second value, the first bit indicates the AP multi-link device not to feed back the communication information of the AP that works on the link corresponding to the first bit and that is in the AP multi-link device. A link is indicated in Manner 3, so that signaling overheads can be reduced.

Figure 25:
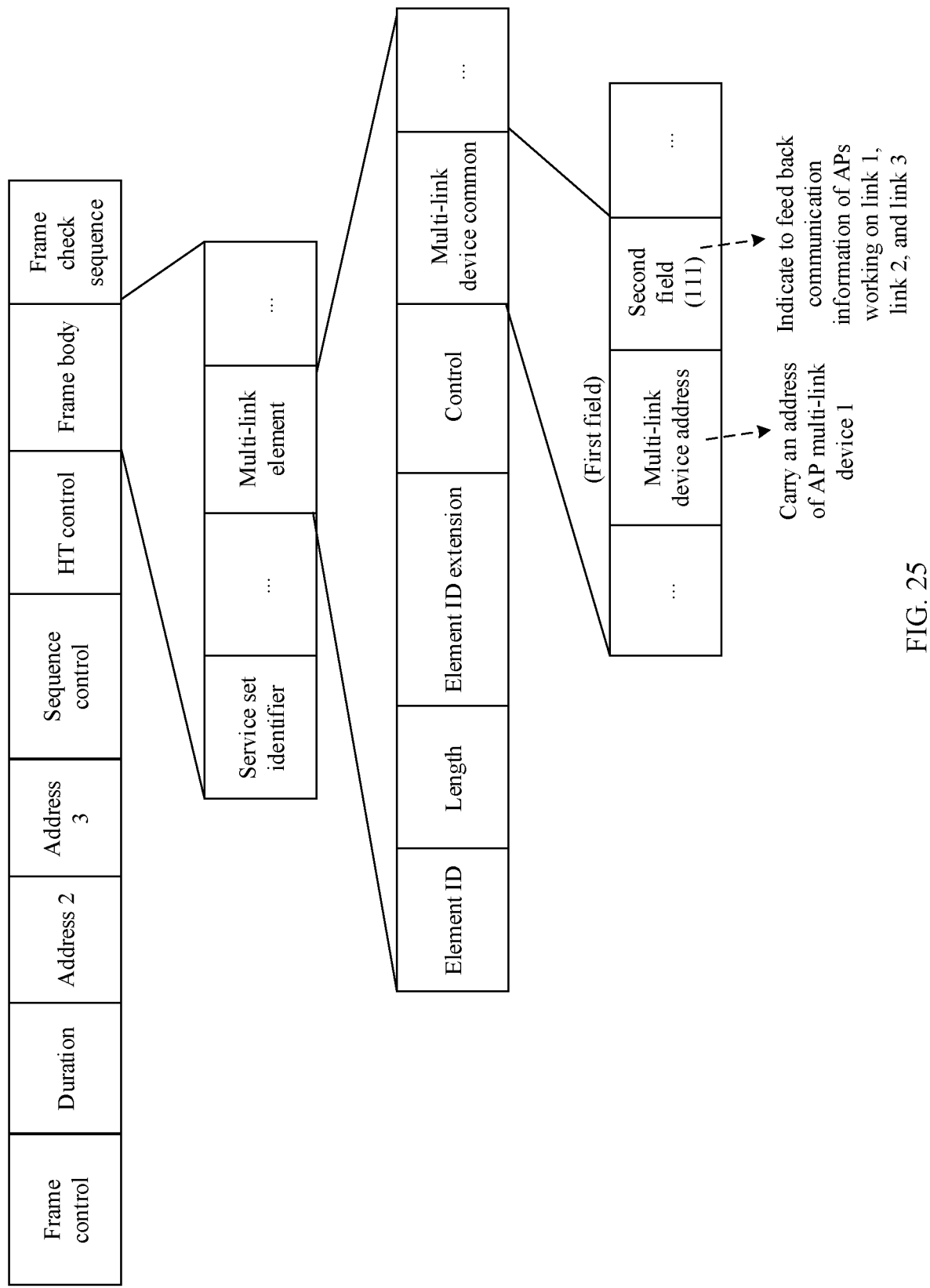
FIG. 25 is a schematic diagram of a frame structure of still another probe request frame according to an embodiment of this application.

For example, if the bitmap includes three bits, the first bit corresponds to link 1, a second bit corresponds to link 2, and a third bit corresponds to link 3. When a value of a bit is 1, the AP multi-link device is indicated to feed back communication information of an AP that is in the AP multi-link device and that works on a link corresponding to the bit. When a value of a bit is 0, the AP multi-link device is indicated not to feed back communication information of an AP that is in the AP multi-link device and that works on a link corresponding to the bit. In this case, if a value of a bitmap is 111, the AP multi-link device is indicated to feed back communication information of APs that work on link 1 to link 3 and that are in the AP multi-link device. If a value of a bitmap is 110, the AP multi-link device is indicated to feed back communication information of APs that work on link 1 and link 2 and that are in the AP multi-link device. When the second field carries the bitmap, the second field may be in a multi-link element, for example, as shown in FIG. 25. Certainly, when the second field carries the bitmap, the second field may alternatively be at another location. This is not limited in this embodiment of this application.

Optionally, when the second field carries the bitmap, the second field may be referred to as a link bitmap field, a bitmap field, or the like.

In a possible implementation, when the second field carries the feedback type, or the second field carries the identifier of the at least one link, or the second field carries the bitmap, the second field may be carried in an element other than the multi-link element. For example, the second field may be carried in a newly added information element.

Figure 26:
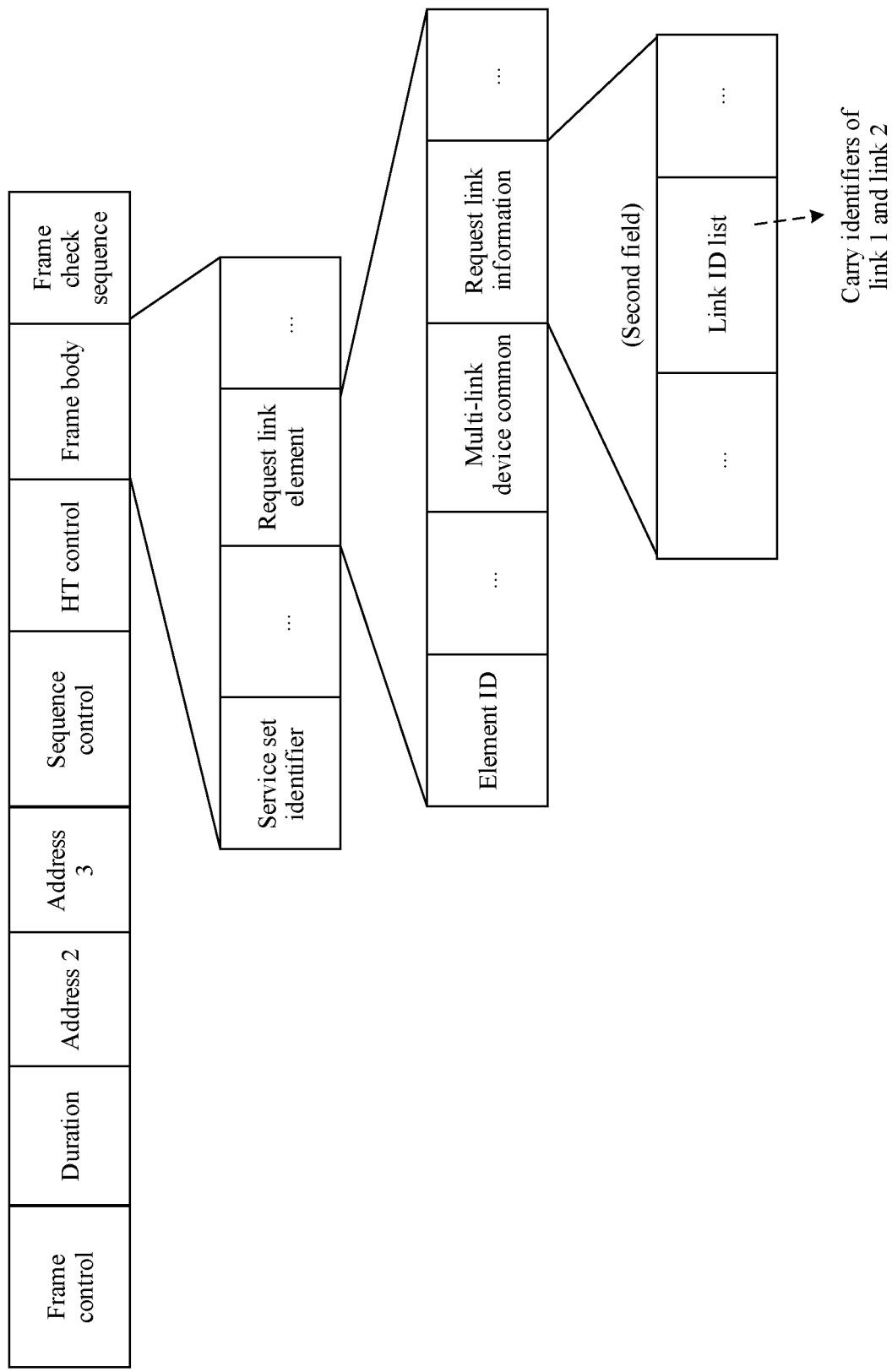
FIG. 26 is a schematic diagram of a frame structure of still another probe request frame according to an embodiment of this application.

For example, as shown in FIG. 26, a request link element (request link element) may be added to the frame body. The request link element is used to indicate a link on which communication information of an AP needs to be fed back. As shown in FIG. 26, the request link element specifically includes a request link information field, and the field carries a link identifier list field. The second field is the link identifier list field. The link identifier list field carries an identifier of link 1 and an identifier of link 2. After receiving the probe request frame, AP multi-link device 1 parses the second field to determine that the STA multi-link device requests communication information of APs on link 1 and link 2. In this case, AP multi-link device 1 feeds back the communication information of AP 1 and AP 2. Similarly, if the second field carrying the bitmap is a link bitmap field, the link identifier list field may also be replaced with the link bitmap field. Alternatively, if the second field carrying the feedback type is a feedback type field, the link identifier list field may be replaced with a feedback type field. Certainly, when the second field carries the feedback type, or the second field carries the identifier of the at least one link, or the second field carries the bitmap, the second field may alternatively be referred to as another field name. This is not limited in this embodiment of this application.

The foregoing describes how the second field indicates a link on which communication information needs to be fed back. In another possible implementation, the second field may not indicate a link on which communication information needs to be fed back. The second field indicates a known link, where communication information of an AP working on the known link is already known to the STA multi-link device. For example, if the STA multi-link device already knows communication information of AP 1 that works on link 1 and that is in AP multi-link device 1, the STA multi-link device only needs to indicate link 1 by using the second field. After receiving the probe request frame, AP multi-link device 1 parses the second field to determine that the STA multi-link device already knows the communication information of AP 1. In this case, AP multi-link device 1 needs to feed back communication information of only AP 2 and AP 3. It can be learned that indicating the known link by using the second field helps reduce signaling overheads.

Optionally, the second field may indicate the known link by carrying an identifier of the known link, or may indicate the known link by carrying a bitmap. The bitmap includes bits corresponding to links, a first bit is any bit in the bitmap, and when a value of the first bit is a first value, the first bit indicates that a link corresponding to the first bit is the known link, or when the value of the first bit is a second value, the first bit indicates that the link corresponding to the first bit is an unknown link. A principle of indicating a known link by using a bitmap is the same as a principle of indicating, by using a bitmap, a link on which communication information needs to be fed back. Details are not described herein again.

Figure 27:
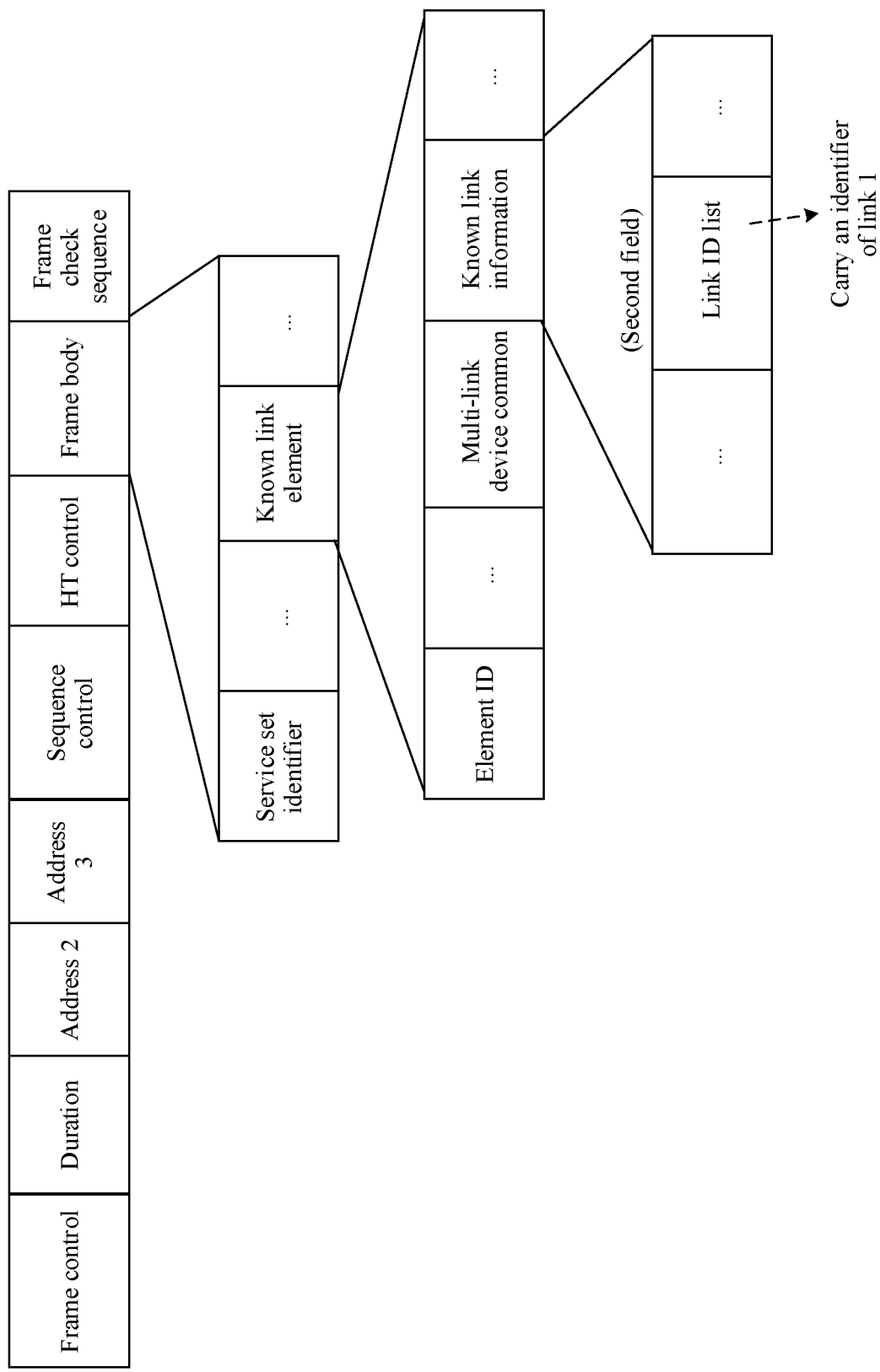
FIG. 27 is a schematic diagram of a frame structure of still another probe request frame according to an embodiment of this application.

For example, as shown in FIG. 27, a known link element (known link element) may be newly added to the frame body. The known link element is used to indicate links, where communication information of APs on the links is already known to the STA multi-link device. The known link element specifically includes a known link information field, and the field carries a link identifier list field. The second field is the link identifier list field. The link identifier list field carries an identifier of link 1. After receiving the probe request frame, AP multi-link device 1 parses the second field to determine that the STA multi-link device already knows the communication information of AP 1. In this case, AP multi-link device 1 needs to feed back communication information of only AP 2 and AP 3. Similarly, if the second field carrying the bitmap is a link bitmap field, the link identifier list field may also be replaced with the link bitmap field.

Figure 28:
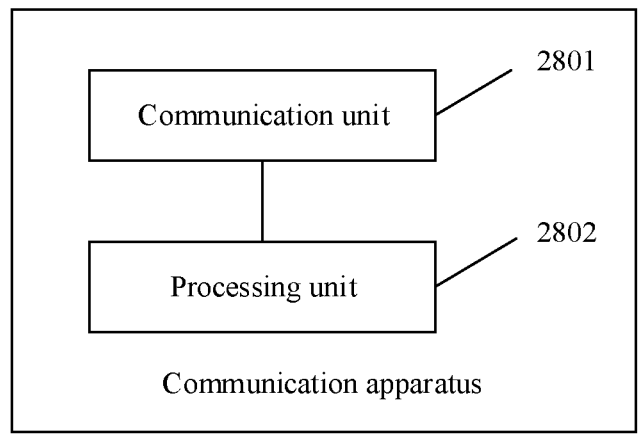
FIG. 28 is a schematic diagram of a structure of a communication apparatus according to an embodiment of this application.

FIG. 28 is a schematic diagram of a structure of a communication apparatus according to an embodiment of this application. The communication apparatus shown in FIG. 28 may be configured to perform some or all functions of the STA multi-link device or the AP multi-link device in the method embodiment described in FIG. 4. The apparatus may be a multi-link device, or may be an apparatus in the multi-link device, or an apparatus that can be used in cooperation with the multi-link device. The communication apparatus may alternatively be a chip system. The communication apparatus shown in FIG. 28 may include a communication unit 2801 and a processing unit 2802. The processing unit 2802 is configured to perform data processing. The communication unit 2801 is integrated with a receiving unit and a sending unit. The communication unit 2801 may also be referred to as a transceiver unit. Alternatively, the communication unit 2801 may be split into a receiving unit and a sending unit. The processing unit 2802 below is similar to the communication unit 2801, and details are not described herein again. Specifically:

When the communication apparatus shown in FIG. 28 is configured to implement the STA multi-link device in the method embodiment described in FIG. 4, the processing unit 2802 is configured to generate a probe request frame, where the probe request frame carries first indication information, the first indication information is used to indicate an access point AP multi-link device to feed back communication information of an AP that works on at least one link and that is in the AP multi-link device, the communication information is used by the STA multi-link device to perform multi-link communication with the AP multi-link device, the at least one link includes a second link, and the second link is different from a first link; and the communication unit 2801 is configured to send the probe request frame on the first link.

In a possible implementation, the communication unit 2801 is further configured to receive, on the first link, a probe response frame sent by the AP multi-link device, where the probe response frame carries the communication information of the AP that works on the at least one link and that is in the AP multi-link device.

When the communication apparatus shown in FIG. 28 is configured to implement the AP multi-link device in the method embodiment described in FIG. 4, the communication unit 2801 is configured to receive, on a first link, a probe request frame sent by a station STA multi-link device, where the probe request frame carries first indication information, the first indication information is used to indicate the AP multi-link device to feed back communication information of an AP that works on at least one link and that is in the AP multi-link device, the communication information is used by the STA multi-link device to perform multi-link communication with the AP multi-link device, the at least one link includes a second link, and the second link is different from the first link; and the communication unit 2801 is further configured to send a probe response frame to the STA multi-link device on the first link, where the probe response frame carries the communication information of the AP that works on the at least one link and that is in the AP multi-link device.

In a possible implementation, the first indication information includes a first field; and the first field carries an address of the AP multi-link device;
  the first field carries an identifier of the AP multi-link device;
  the first field carries a service set identifier SSID of the AP multi-link device;
  the first field carries an SSID of the AP multi-link device on the first link; or
  a value of the first field is a preset value, and the first field is specifically used to indicate the AP multi-link device that receives the probe request frame to feed back the communication information.

In a possible implementation, the first indication information further includes a second field, and the second field is used to indicate the at least one link.

In a possible implementation, the second field carries a feedback type, and when the feedback type is a first value, the feedback type is used to indicate the AP multi-link device to feed back communication information of APs that work on all links and that are in the AP multi-link device;
  the second field carries an identifier of the at least one link; or
  the second field carries a bitmap, the bitmap includes bits corresponding to links, a first bit is any bit in the bitmap, and when a value of the first bit is a first value, the first bit indicates the AP multi-link device to feed back communication information of an AP that works on a link corresponding to the first bit and that is in the AP multi-link device, or when the value of the first bit is a second value, the first bit indicates the AP multi-link device not to feed back the communication information of the AP that works on the link corresponding to the first bit and that is in the AP multi-link device.

In a possible implementation, the first field is in a multi-link element (multi-link element) of the probe request frame.

In a possible implementation, the first field is a multi-link device address (MLD address) field in the multi-link element, and the multi-link device address field carries the address of the AP multi-link device, or a value of the multi-link device address field is the preset value.

In a possible implementation, the multi-link element further carries second indication information, and the second indication information indicates that the multi-link device address field is used to indicate an AP multi-link device that needs to feed back the communication information.

Figure 29A:
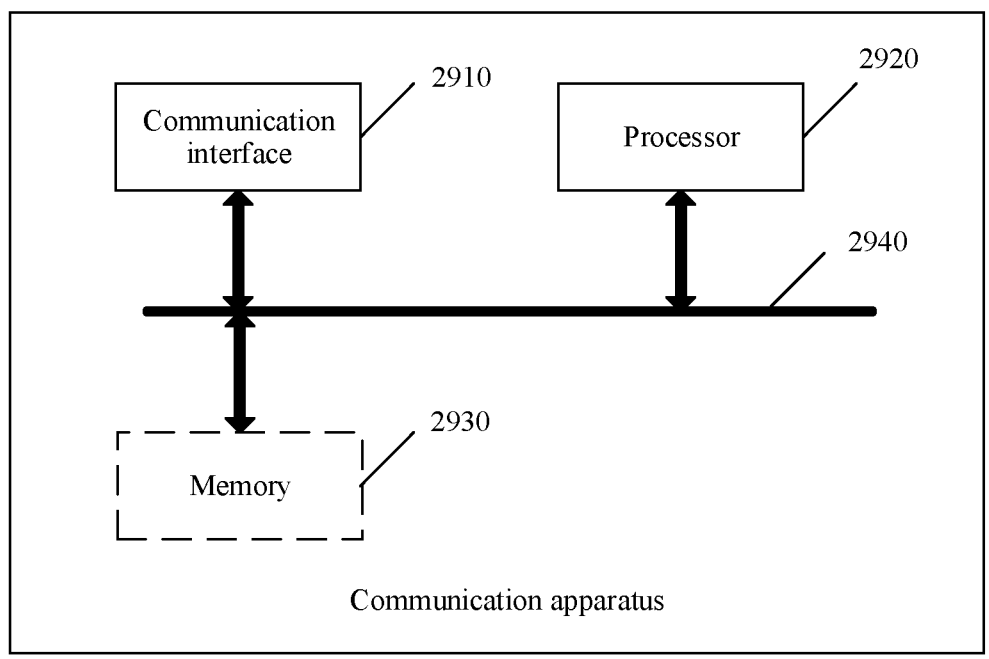
FIG. 29a is a schematic diagram of a structure of another communication apparatus according to an embodiment of this application.

FIG. 29a shows a communication apparatus 290 according to an embodiment of this application. The apparatus is configured to implement functions of the STA multi-link device or the AP multi-link device in FIG. 4. The apparatus may be a multi-link device or an apparatus used in the multi-link device. The apparatus used in the multi-link device may be a chip system or a chip in the multi-link device. The chip system may include a chip, or may include a chip and another discrete component.

The communication apparatus 290 includes at least one processor 2920, configured to implement a data processing function of the STA multi-link device or the AP multi-link device in the method provided in the embodiments of this application. The apparatus 290 may further include a communication interface 2910, configured to implement a receiving/sending operation of the STA multi-link device or the AP multi-link device in the method provided in the embodiments of this application. In the embodiments of this application, the communication interface may be a transceiver, a circuit, a bus, a module, or a communication interface of another type, and is configured to communicate with another device through a transmission medium. For example, the communication interface 2910 is used by an apparatus in the apparatus 290 to communicate with another device. The processor 2920 sends or receives data through the communication interface 2910, and is configured to implement the method in FIG. 4 in the foregoing method embodiment.

The apparatus 290 may further include at least one memory 2930, configured to store program instructions and/or data. The memory 2930 is coupled to the processor 2920. The coupling in this embodiment of this application is an indirect coupling or a communication connection between apparatuses, units, or modules, may be in an electrical form, a mechanical form, or another form, and is used for information exchange between the apparatuses, the units, or the modules. The processor 2920 may cooperate with the memory 2930. The processor 2920 may execute the program instructions stored in the memory 2930. At least one of the at least one storage may be included in the processor.

In this embodiment of this application, a specific connection medium between the communication interface 2910, the processor 2920, and the memory 2930 is not limited. In this embodiment of this application, the memory 2930, the processor 2920, and the communication interface 2910 are connected by using a bus 2940 in FIG. 29a, and the bus is represented by a bold line in FIG. 29a. A connection manner between other components is schematically described, and is not limited thereto. The bus may be classified into an address bus, a data bus, a control bus, or the like. For ease of representation, only one thick line is used to represent the bus in FIG. 29a, but this does not mean that there is only one bus or only one type of bus.

When the apparatus 290 is specifically a chip or a chip system, the communication interface 2910 may output or receive a baseband signal. When the apparatus 290 is specifically a multi-link device, the communication interface 2910 may output or receive a radio frequency signal. In this embodiment of this application, the processor may be a general-purpose processor, a digital signal processor, an application-specific integrated circuit, a field programmable gate array or another programmable logic device, a discrete gate or a transistor logic device, or a discrete hardware component, and may implement or perform the methods, operations, and logical block diagrams disclosed in this embodiment of this application. The general-purpose processor may be a microprocessor, any conventional processor, or the like. The operations in the methods disclosed with reference to the embodiments of this application may be directly performed and completed by a hardware processor, or may be performed and completed by a combination of hardware in the processor and a software module.

Figure 29B:
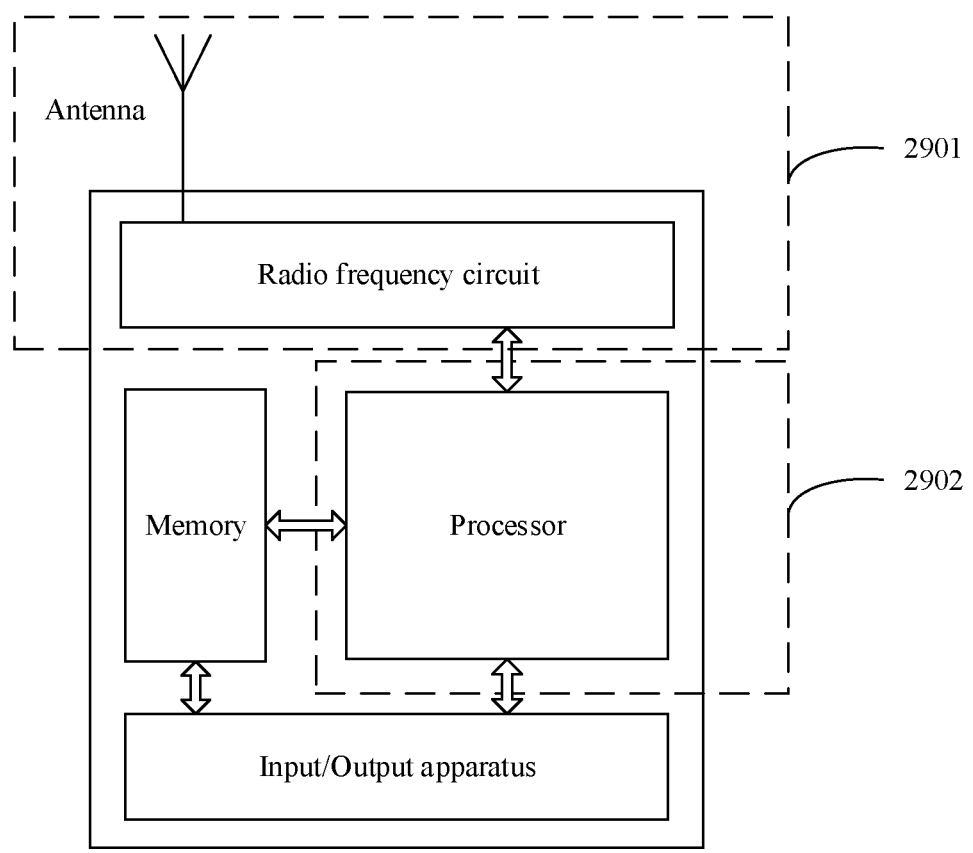
FIG. 29b is a schematic diagram of a structure of still another communication apparatus according to an embodiment of this application.

In an example, FIG. 29b is a schematic diagram of a structure of another communication apparatus 2900 according to an embodiment of this application. The communication apparatus 2900 may be a STA multi-link device or an AP multi-link device. The communication apparatus 2900 may perform operations performed by the STA multi-link device or the AP multi-link device in the foregoing method embodiment.

For ease of description, FIG. 29b shows only main components of the communication apparatus 2900. As shown in FIG. 29b, the communication apparatus 2900 includes a processor, a memory, a radio frequency circuit, an antenna, and an input/output apparatus. The processor is mainly configured to: process a communication protocol and communication data, control the entire communication apparatus 2900, execute a software program, and process data of the software program, for example, support the communication apparatus 2900 in performing the procedure described in FIG. 4. The memory is mainly configured to store the software program and the data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The communication apparatus 2900 may further include an input/output apparatus, for example, a touchscreen, a display screen, or a keyboard that is mainly configured to receive data entered by a user and output data to the user. It should be noted that some types of communication apparatuses 2900 may not have the input/output apparatus.

After the communication apparatus 2900 is powered on, the processor may read the software program in the storage unit, interpret and execute the software program, and process data of the software program. When data needs to be sent in a wireless manner, after the processor performs baseband processing on the to-be-sent data, the processor outputs a baseband signal to the radio frequency circuit. After performing radio frequency processing on the baseband signal, the radio frequency circuit sends a radio frequency signal through an antenna in a form of an electromagnetic wave. When data is sent to the communication apparatus 2900, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that for ease of description, FIG. 29b shows only one memory and only one processor. In an actual communication apparatus 2900, there may be a plurality of processors and memories. The memory may also be referred to as a storage medium, a storage device, or the like. This is not limited in the embodiments of this application.

In an optional implementation, the processor may include a baseband processor and a central processing unit (central processing unit, CPU). The baseband processor is mainly configured to process a communication protocol and communication data, and the CPU is mainly configured to control the entire communication apparatus 2900, execute a software program, and process data of the software program. Optionally, the processor may alternatively be a network processor (network processor, NP) or a combination of a CPU and an NP. The processor may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), generic array logic (generic array logic, GAL), or any combination thereof. The memory may include a volatile memory (volatile memory), for example, a random access memory (random-access memory, RAM). The memory may alternatively include a non-volatile memory (non-volatile memory), for example, a flash memory (flash memory), a hard disk drive (hard disk drive, HDD), or a solid-state drive (solid-state drive, SSD). The memory may alternatively include a combination of the foregoing types of memories.

For example, in this embodiment of this application, as shown in FIG. 29b, an antenna and a radio frequency circuit with sending and receiving functions may be considered as the communication unit 2901 of the communication apparatus 2900, and a processor with a processing function may be considered as the processing unit 2902 of the communication apparatus 2900.

The communication unit 2901 may also be referred to as a transceiver, a transceiver apparatus, a transceiver unit, or the like, and is configured to implement the sending and receiving functions. Optionally, a component that is in the communication unit 2901 and that is configured to implement a receiving function may be considered as a receiving unit, and a component that is in the communication unit 2901 and that is configured to implement a sending function may be considered as a sending unit. That is, the communication unit 2901 includes the receiving unit and the sending unit. For example, the receiving unit may also be referred to as a receiver, a receiver circuit, or the like, and the sending unit may be referred to as a transmitter, a transmitter circuit, or the like.

In some embodiments, the communication unit 2901 and the processing unit 2902 may be integrated into one device, or may be separated as different devices. In addition, the processor and the memory may be integrated into one device, or may be separated as different devices.

The communication unit 2901 may be configured to perform receiving and sending operations of the communication apparatus 2900 in the foregoing method embodiment. The processing unit 2902 may be configured to perform a data processing operation of the communication apparatus 2900 in the foregoing method embodiment.

An embodiment of this application further provides a computer-readable storage medium. The computer-readable storage medium stores instructions. When the instructions run on a processor, a method procedure in the foregoing method embodiment is implemented.

An embodiment of this application further provides a computer program product. When the computer program product runs on a processor, a method procedure in the foregoing method embodiment is implemented.

It should be noted that, for brief description, the foregoing method embodiment is represented as a combination of a series of actions. However, a person skilled in the art should understand that this application is not limited to the described order of the actions, because according to this application, some operations may be performed in other orders or simultaneously. It should be further appreciated by persons skilled in the art that the embodiments described in this specification all belong to exemplary embodiments, and the involved actions and modules are not necessarily required in this application.

Cross reference may be made to descriptions of the embodiments provided in this application, and the descriptions of the embodiments have different focuses. For a part not described in detail in an embodiment, refer to related descriptions of another embodiment. For ease of description and brevity, for functions of the apparatuses and devices provided in the embodiments of this application and operations performed by the apparatuses and devices, refer to related descriptions of the method embodiments of this application. The method embodiments and the apparatus embodiments may also be mutually referenced, combined, or cited.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A communication apparatus comprising:
a processor; and
a memory coupled to the processor and storing computer program instructions that, when executed by the processor, cause the communication apparatus to perform:
generating a probe request frame, wherein the probe request frame carries a multi-link element that is used to indicate a first access point (AP) of an AP multi-link device to feed back information of one or more second access points (APs) of the AP multi-link device; wherein the multi-link element comprises a feedback type with a first value, the first value of the feedback type being used to indicate the AP multi-link device to feed back information of APs that work on all links and that are in the AP multi-link device; and
sending the probe request frame to the first AP.

2. The communication apparatus according to claim 1, wherein the multi-link element comprises a first field for indicating the AP multi-link device and a second field for identifying a link of at least one of the one or more second APs.

3. The communication apparatus according to claim 2, wherein the second field carries:
a link identifier of the link of at least one of the one or more second APs.

4. The communication apparatus according to claim 1, wherein the computer program instructions, when executed by the processor, cause the communication apparatus to perform receiving a probe response frame sent by the first AP, wherein the probe response frame carries the information of the one or more second APs.

5. The communication apparatus according to claim 1, wherein the multi-link element comprises a first field for carrying at least one of the following:
   an address of the AP multi-link device;
   an identifier of the AP multi-link device;
   a service set identifier (SSID) of the AP multi-link device;
   an SSID of the AP multi-link device on a first link; or
   a value of the first field is a preset value, and the first field is used to indicate the AP multi-link device that receives the probe request frame to feed back the information.

6. A multi-link device probing method, comprising:
   generating a probe request frame, wherein the probe request frame comprises a multi-link element that is used to indicate a first access point (AP) of an AP multi-link device to feed back information of one or more second access points (APs) of the AP multi-link device; wherein the multi-link element comprises a feedback type with a first value, the first value of the feedback type being used to indicate the AP multi-link device to feed back information of APs that work on all links and that are in the AP multi-link device; and
   sending the probe request frame to the first AP.

7. The method according to claim 6, wherein the multi-link element comprises a first field for indicating the AP multi-link device and a second field for identifying a link of at least one of the one or more second APs.

8. The method according to claim 6, further comprising:
   receiving a probe response frame sent by the first AP, wherein the probe response frame carries the information of the one or more second APs.

9. The method according to claim 6, wherein the multi-link element comprises a first field for carrying at least one of the following:
   an address of the AP multi-link device;
   an identifier of the AP multi-link device;
   a service set identifier (SSID) of the AP multi-link device;
   an SSID of the AP multi-link device on a first link; or
   a value of the first field is a preset value, and the first field is used to indicate the AP multi-link device that receives the probe request frame to feed back the information.

10. The method according to claim 6, wherein the second field carries:
    an identifier of the link of the at least one of the one or more second APs.

11. A chip, comprising at least one processor and a communication interface,
    wherein the processor is configured to execute a computer program to perform:
        generating a probe request frame, wherein the probe request frame carries a multi-link element that is used to indicate a first access point (AP) of an AP multi-link device to feed back information of one or more second access points (APs) of the AP multi-link device; wherein the multi-link element comprises a feedback type with a first value, the first value of the feedback type being used to indicate the AP multi-link device to feedback information of APs that work on all links and that are in the AP multi-link device; and
    wherein the communication interface is configured to output the probe request frame to be sent to the first AP.

12. The chip according to claim 11, wherein the multi-link element comprises a first field for indicating the AP multi-link device and a second field for identifying a link of at least one of the one or more second APs.

13. The chip according to claim 11, wherein
    the communication interface is further configured to receive a probe response frame by the first AP, wherein the probe response frame carries the information of the one or more second APs.

14. The chip according to claim 11, wherein the multi-link element comprises a first field carrying at least one of the following:
    an address of the AP multi-link device;
    an identifier of the AP multi-link device;
    a service set identifier (SSID) of the AP multi-link device;
    an SSID of the AP multi-link device on a first link; or
    a value of the first field is a preset value, and the first field is used to indicate the AP multi-link device that receives the probe request frame to feed back the information.

15. A station (STA) multi-link device, comprising:
    a processor;
    a memory coupled to the processor and storing computer program instructions that, when executed by the processor, cause the STA multi-link device to perform:
        generating a probe request frame, wherein the probe request frame comprises a multi-link element that is used to indicate a first access point (AP) of an AP multi-link device to feed back information of one or more second APs of the AP multi-link device; wherein the multi-link element comprises a feedback type with a first value, the first value of the feedback type being used to indicate the AP multi-link device to feed back information of APs that work on all links and that are in the AP multi-link device; and
    sending the probe request frame to the first AP.

16. The STA multi-link device according to claim 15, wherein the multi-link element comprises a first field for indicating the AP multi-link device and a second field for identifying a link of at least one of the one or more second APs.

* * * * *